United States Patent [19]

Culley

[11] Patent Number: 5,091,850
[45] Date of Patent: Feb. 25, 1992

[54] SYSTEM FOR FAST SELECTION OF NON-CACHEABLE ADDRESS RANGES USING PROGRAMMED ARRAY LOGIC

[75] Inventor: Paul R. Culley, Cypress, Tex.

[73] Assignee: Compaq Computer Corporation, Houston, Tex.

[21] Appl. No.: 474,652

[22] Filed: Feb. 2, 1990

Related U.S. Application Data

[63] Continuation of Ser. No. 102,507, Sep. 28, 1987, abandoned.

[51] Int. Cl.$^5$ .................. G06F 12/00; G06F 13/00
[52] U.S. Cl. ................ 395/400; 364/243.4; 364/243.41; 364/256.8; 364/244.9; 364/259.9; 364/964.2; 364/965.77; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,399,503 | 8/1983 | Hawley | 364/200 |
| 4,591,975 | 5/1986 | Wade et al. | 364/200 |
| 4,646,233 | 2/1987 | Weatherford et al. | 364/200 |
| 4,719,568 | 1/1988 | Carrubba et al. | 364/200 |

OTHER PUBLICATIONS

Intel Product Data Book, 82385 High Performance 32-bit Cache Controller.
Intel Product Data Book, 80386 High Performance 32-bit CHMOS Microprocessor.

Primary Examiner—Thomas C. Lee
Assistant Examiner—Ayni Mohamed
Attorney, Agent, or Firm—Christopher D. Keirs

[57] ABSTRACT

A fast logic system for decoding addresses for the purpose of designating areas of memory as non-cacheable is disclosed. The logic system is based on a programmable array logic having as inputs selected address lines, certain switch settings, and software-selectable diagnostic settings.

1 Claim, 9 Drawing Sheets

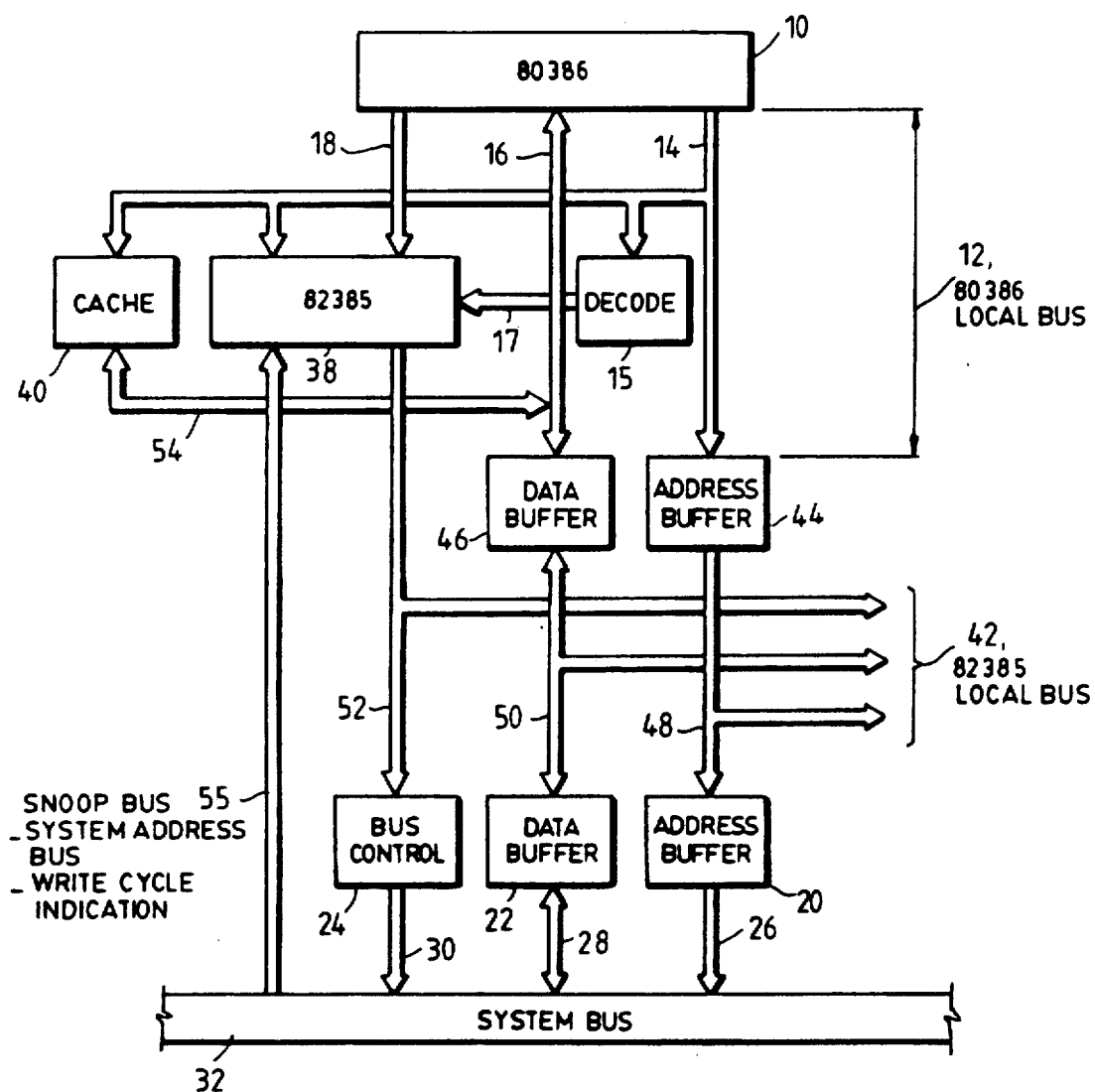

| 80386 BUS CYCLE DEFINITION | | | | | | 82385 RESPONSE WHEN DECODED AS CACHEABLE | | | 82385 RESPONSE WHEN DECODED AS NON-CACHEABLE | | | 82385 RESPONSE WHEN DECODED AS AN 80386 LOCAL BUS ACCESS | | |
|---|---|---|---|---|---|---|---|---|---|---|---|---|---|---|
| M/IO# | D/C# | W/R# | 80386 CYCLE | | | CACHE | CACHE DIRECTORY | 82385 LOCAL BUS | CACHE | CACHE DIRECTORY | 82385 LOCAL BUS | CACHE | CACHE DIRECTORY | 82385 LOCAL BUS |
| 0 | 0 | 0 | INT ACK | | N/A | - | | INT ACK | - | | INT ACK | - | - | IDLE |
| 0 | 0 | 1 | UNDEFINED | | N/A | | | UNDEFINED | | | UNDEFINED | - | - | IDLE |
| 0 | 1 | 0 | I/O READ | | N/A | - | | I/O READ | - | | I/O READ | - | - | IDLE |
| 0 | 1 | 1 | I/O WRITE | | N/A | - | | I/O WRITE | - | | I/O WRITE | - | - | IDLE |
| 1 | 0 | 0 | MEM CODE READ | HIT | | CACHE READ | - | IDLE | | | MEM CODE READ | - | - | IDLE |
| 1 | 0 | 0 | MEM CODE READ | MISS | | CACHE WRITE | DATA VALIDATION | MEM CODE READ | | | | | | |
| 1 | 0 | 1 | HALT/ SHUTDOWN | | N/A | - | | HALT/ SHUTDOWN | - | | HALT/ SHUTDOWN | - | - | IDLE |
| 1 | 1 | 0 | MEM DATA READ | HIT | | CACHE READ | - | IDLE | | | MEM DATA READ | - | - | IDLE |
| 1 | 1 | 0 | MEM DATA READ | MISS | | CACHE WRITE | DATA VALIDATION | MEM DATA READ | | | | | | |
| 1 | 1 | 1 | MEM DATA WRITE | HIT | | CACHE WRITE | - | MEM DATA WRITE | - | | MEM DATA WRITE | - | - | IDLE |
| 1 | 1 | 1 | MEM DATA WRITE | MISS | | - | - | MEM DATA WRITE | | | | | | |

Fig. 5

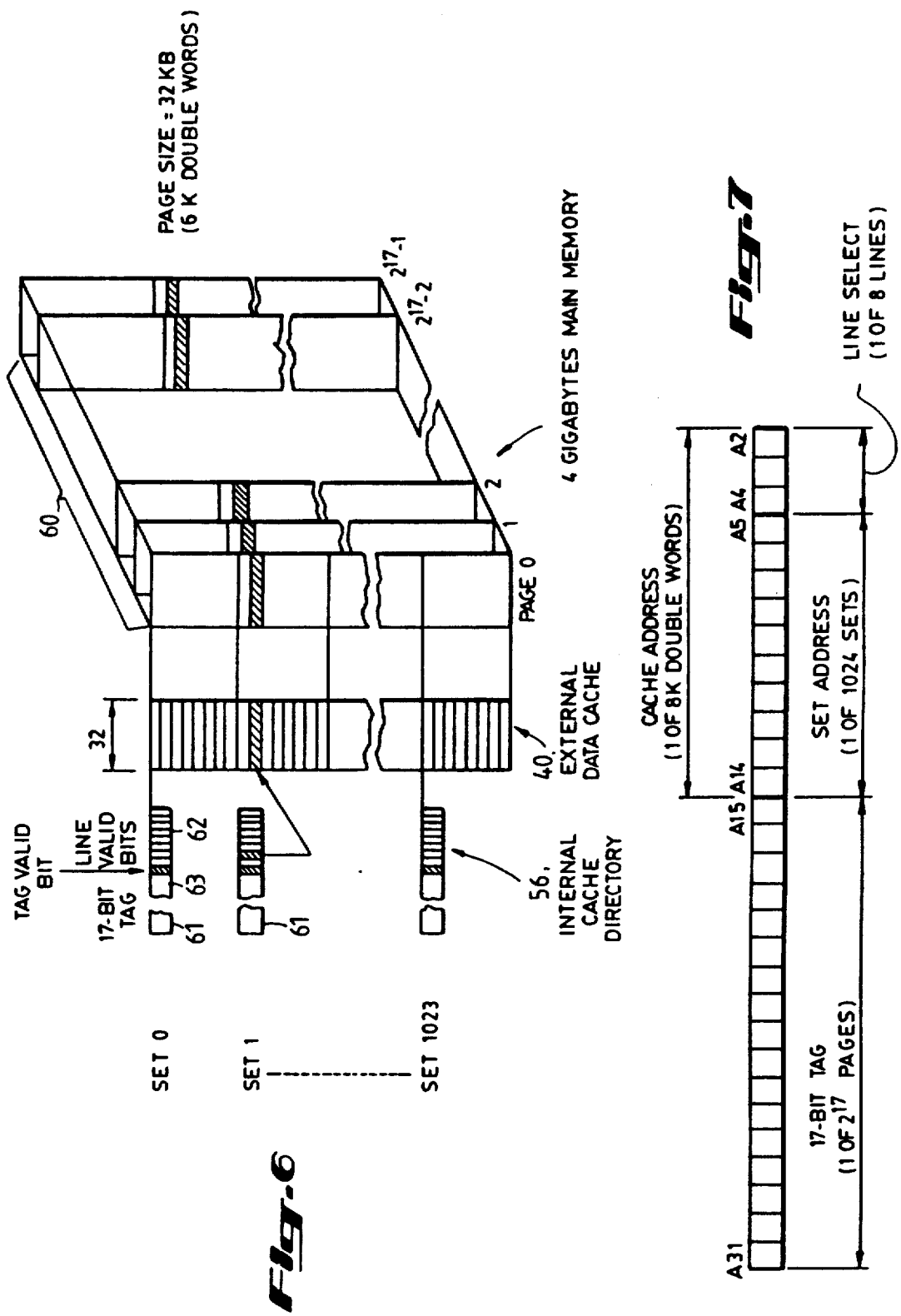

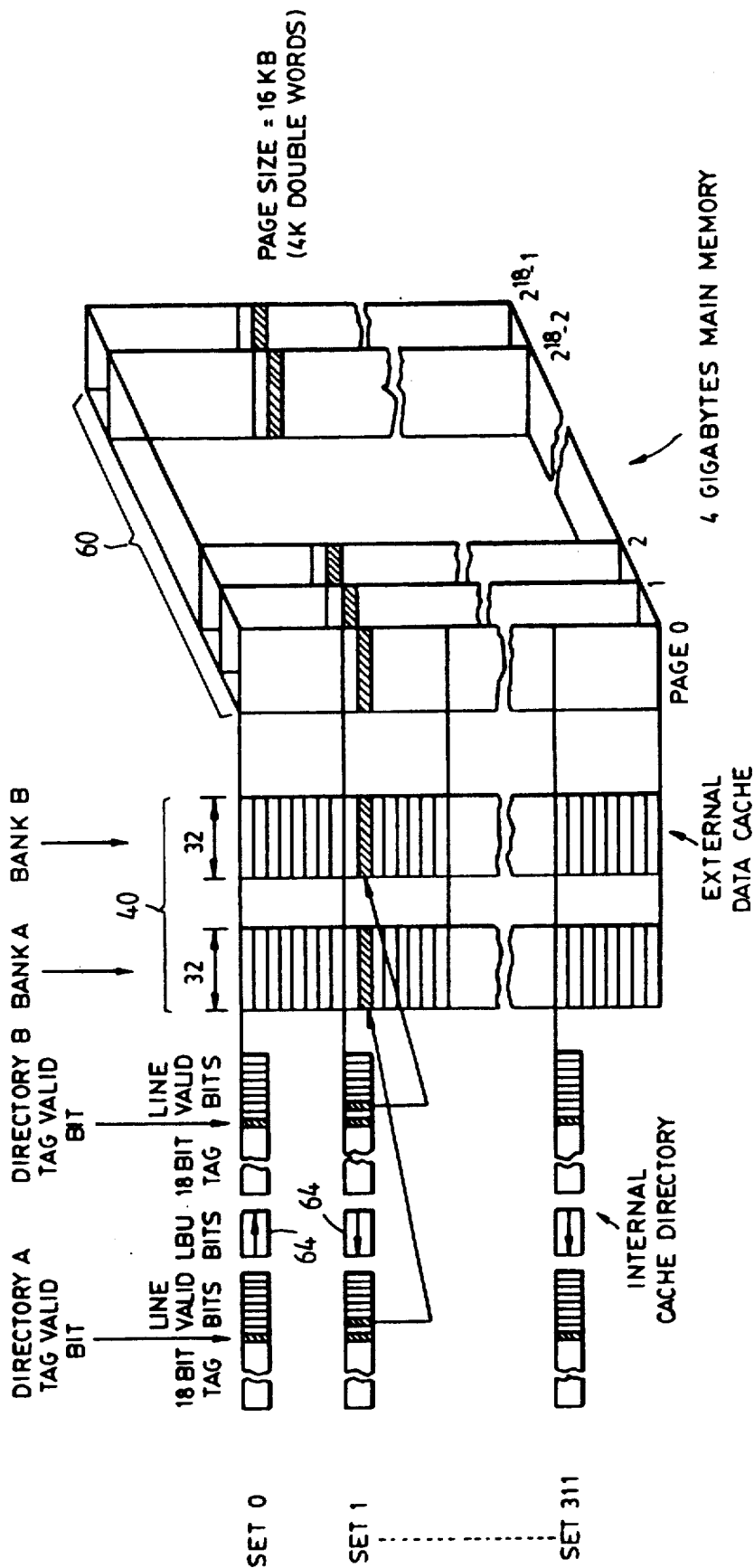

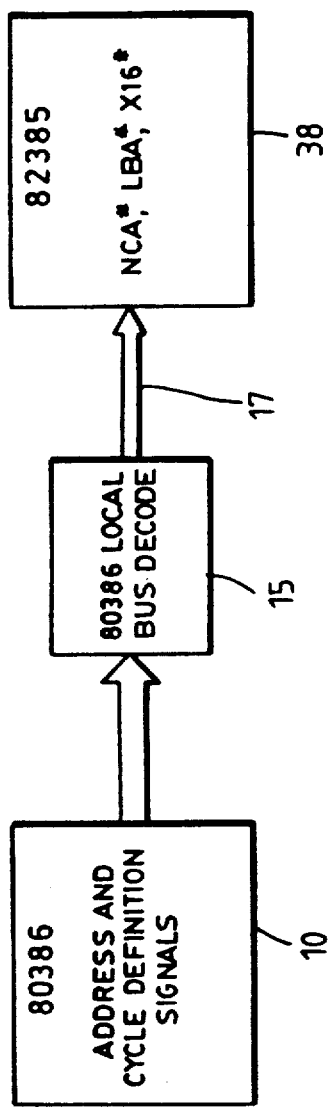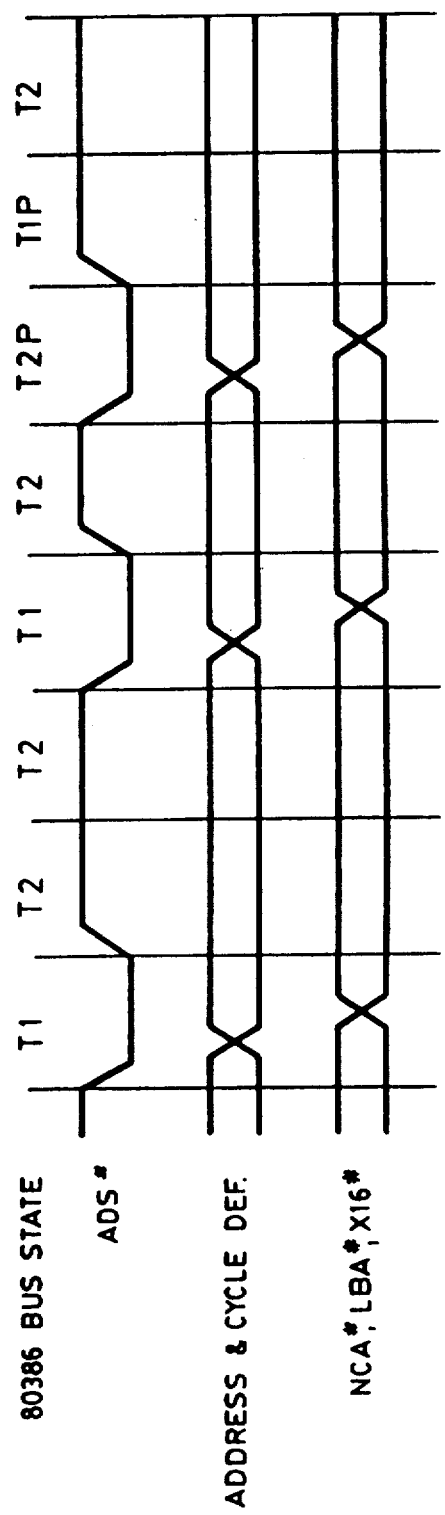

SYSTEM FOR FAST SELECTION OF NON-CACHEABLE ADDRESS RANGES USING PROGRAMMED ARRAY LOGIC

This is a continuation of co-pending application Ser. No. 07/102,507 filed on Sept. 28, 1987 now abandoned.

BACKGROUND OF THE INVENTION

1. Field of the Invention

This invention relates to computers. More particularly, it relates to computers having memory cache controllers.

2. Description of the Prior Art

Designers working with the powerful new general-purpose 32-bit microprocessors are finding that coming up with a high-performance system takes more than just a powerful central processor. As they gain experience with 32-bit chips, designers find they must adopt many of the architectural refinements associated with high-performance superminicomputers and mainframes in order to get full performance out of these tiny computing engines. In particular, they are moving to a hierarchical memory scheme in which high-speed cache, or buffer memory, is placed between the CPU and main memory to increase a system's throughput.

As better designs whittle away at the miss rate for accessed data—the percentage of times main memory must be read because the data required is not in the cache—they reduce the amount of time the CPU's must spend in deliberately programmed wait states until memory accesses are completed. Toward this end, a number of semiconductor companies are coming up with chips for cache-based microprocessor systems: special memory parts for building cache buffers and highly integrated cache controller chips, such as the 82385 32-bit cache controller produced by Intel Corporation.

Cache is now seen as a way to take full advantage of the new 32-bit microprocessors, especially in multiple-microprocessor configurations. Without cache, designers must use either commercially available 100- to 120-ns dynamic random-access memories and introduce wait states, or shift to the use of 50- to 60-ns static RAM's, which are much more expensive and also reduce the system's circuit density.

Cache architectures offer a way out of this dilemma by storing the information most frequently accessed from the main memory. In such schemes, the buffer between the CPU and the main memory usually consists of the data cache, for storage of the data copied from main memory, and the cache tag memory, which is used to store the memory address locations.

When the CPU requests data from memory, the cache controller checks to see whether the address the CPU is issuing matches an address found in the cache tag RAM. If it does, the data in the cache data RAM corresponding to the matching cache tag address is sent to the CPU. Thus, when the CPU tries to read data from the main memory, the high-speed cache will respond first if it has a copy of the requested data. Otherwise, a normal main-memory cycle takes place. In typical systems, data will be supplied by the cache memory more than 90% of the time—that is, the system will have a better than 90% hit rate.

Although the operation of a typical cache is relatively simple in concept, implementation is a complex process involving such factors as the type of memory mapping involved, the cache size, the size of transferred blocks of data, the data-replacement algorithm, and write-request handling. Whereas present circuits are combined with external logic to implement what are called direct-mapped replacement algorithms—in which each memory address maps into the cache at one memory location—the new integrated solutions use more advanced set-associative schemes, in which each address can be mapped into many different locations. And whereas the first allows hit rates from 65% to 90%, depending on the amount of cache memory used and other factors, the advanced solutions allow hit rates in excess of 90%, using one-half to one-fourth the amount of memory space.

A two-way set-associative cache controller for the 80386 from Intel is designated the 82385. It requires 8Kbits by 32 bits of external SRAM, two address latches, and a data-receiver circuit for bus separation. It can also be used in direct-mapped cache architectures.

Intel's 82385 cache controller will work with the 80386 microprocessor in either a direct-mapped or the two-way set-associative cache configuration.

The 132-pin 82385 contains not only the cache-tag function but a "posted write-through" feature that uses on-board buffers to make information immediately available to an 80386 system bus.

Finally, the 82385 cache controller has features such as bus watching and posted writethrough. The 82385 cache-memory controller, which can store address tags for 32-K bytes of cache memory can run at 16 and 20 MHz.

The cache-tag function acts as a self-initiating directory of what data is being held in SRAM-based cache storage. It automatically checks incoming addresses from hot processors against the data copied in cache from slower dynamic random-access main memory. These specialized address-matching memories can boost system throughput by offloading overhead from a busy host.

The 82385 cache controller fills a need imposed by the ever-faster CPU's. At 20 MHz, cache memory will become a virtual requirement to realize the full performance capability of the CPU. The 82385 stores the address tags for caches of up to 32-K bytes. At 20 MHz, you can use 35-ns SRAM's, which are generally available today.

The cache controller can also monitor the system bus to see what data is changed in main memory and then invalidate corresponding cache data. Using the same technique, it can maintain coherency among several caches in a multiprocessor system.

The 82385 cache controller is a high performance 32-bit peripheral for Intel's 80386 microprocessor. It stores a copy of frequency accessed code and data from main memory in a zero wait state local cache memory. The 82385 enables the 80386 to run at its full potential by reducing the average number of CPU wait states to nearly zero. The dual bus architecture of the 82385 allows other masters to access system resources while the 80386 operates locally out of its cache. In this situation, the 82385's "bus watching" mechanism preserves cache coherency by monitoring the system bus address lines at no cost to system or local throughput.

The 82385 is completely software transparent, protecting the integrity of system software. High performance and board savings are achieved because the 82385 integrates a cache directory and all cache management logic on one chip.

SUMMARY OF THE INVENTION

In accordance with one embodiment of the invention, a computer system has a cache memory with certain areas of the main memory designated as "non-cacheable", i.e., not to be copied into the cache. A decoder operating within one read cycle selects whether or not data is to be cached. This address decoder is implemented in a high-speed programmed array logic (PAL). The cache controller receives an input (NCA) from this decoder and determines, without inserting wait states, whether to cache data from a particular region of memory. This is useful for memory-mapped input/output, such as video displays, which may be altered through means other than directly through the CPU or microprocessor. When regions of memory may be altered without altering the corresponding copy of the data in the cache, the cache may contain false data; the arrangement of the invention avoids this problem.

BRIEF DESCRIPTION OF THE DRAWINGS

The novel features believed to be characteristic of the invention are set forth in the appended claims. The invention itself, however, as well as other features and advantages thereof, may best be understood by reference to the following detailed description of specific embodiments, when read in conjunction with the accompanying drawings, wherein:

FIG. 4 is an electrical diagram in block form of a computer system and its bus structure using an 80386 microprocessor, with bus watching in an 82385 system having a "snoop bus" 54;

FIG. 5 is a table summarizing the 82385 response to all 80386 bus cycles, depending on whether the cycle is designated local or non-cacheable;

FIG. 6 is a diagram of the relationship between the 82385's internal cache directory, the external cache memory, and the 80386's address space;

FIG. 7 is a diagram of a 32-bit word on the 80386 address bus for a direct mapped cache;

FIG. 8 is a diagram of the relationship between the directory, cache, and 80386 address space, like FIG. 6, for a two-way set-associative cache;

FIG. 11 is a diagram of the decode configuration for the generation of LBA#, NCA#, and X16#, according to one embodiment;

FIG. 12 is a timing diagram for the generation of LBA#, NCA#, and X16# of FIG. 11 or FIG. 2.

DETAILED DESCRIPTION OF SPECIFIC EMBODIMENT

82385 FUNCTIONAL OVERVIEW

Figure 1:
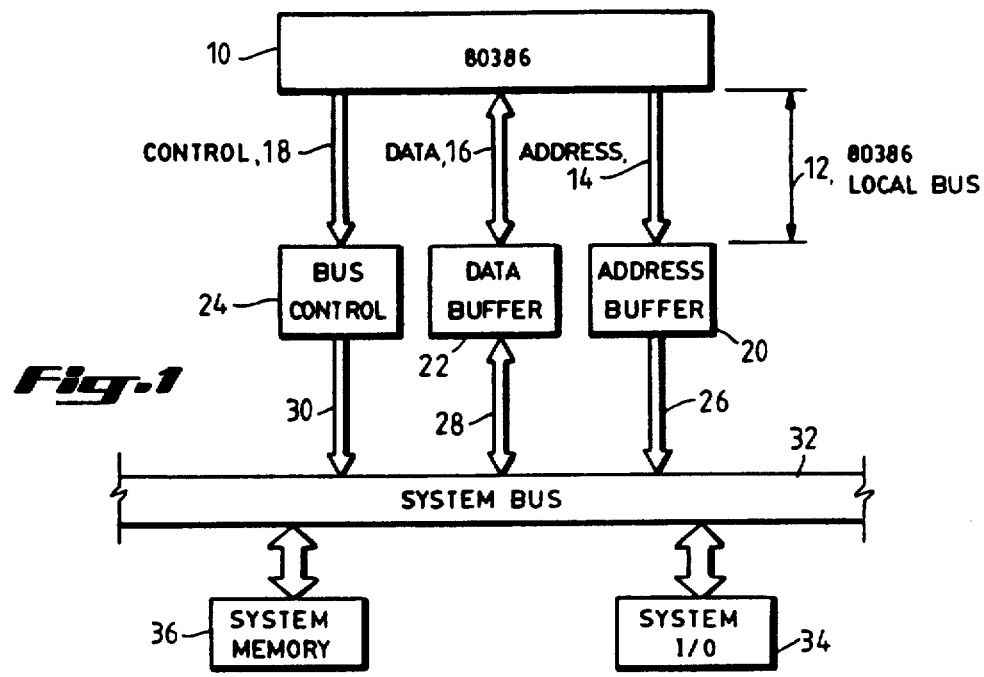
FIG. 1 is an electrical diagram in block form of a computer system and its bus structure using an 80386 microprocessor, having no cache controller, according to the prior art.
Figure 2:
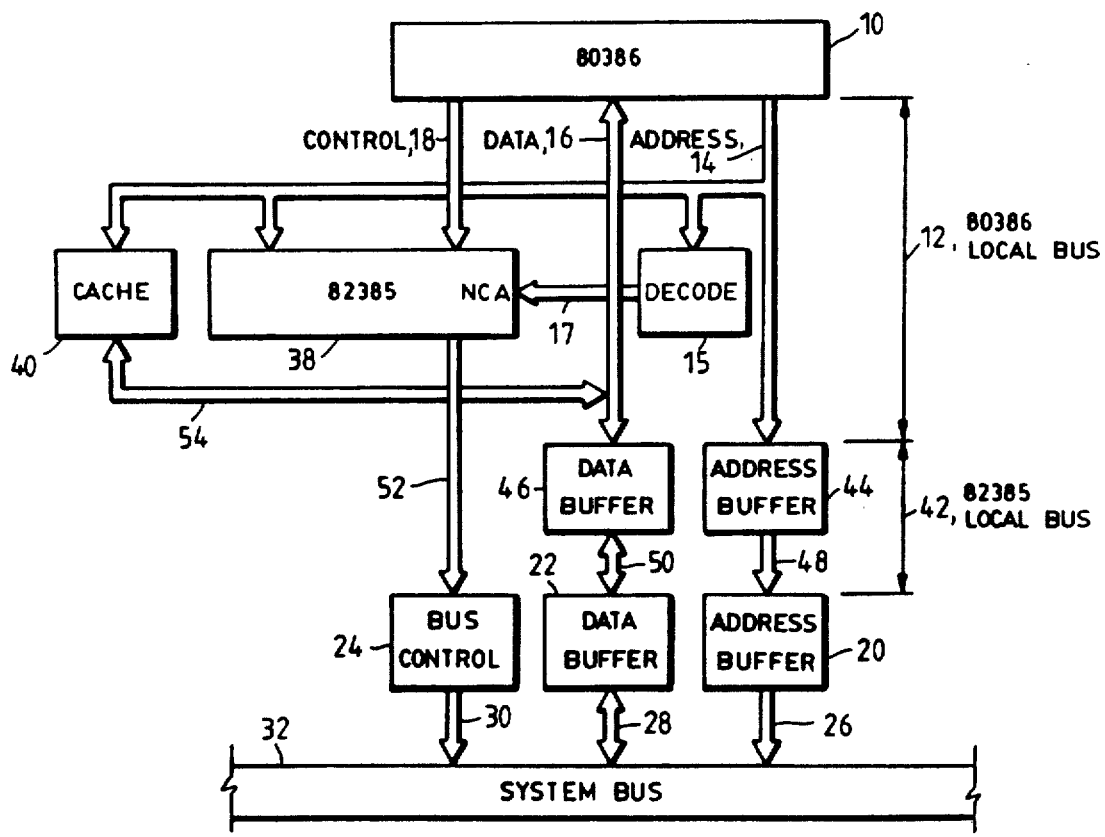
FIG. 2 is an electrical diagram in block form of a computer system and its bus structure using an 80386 microprocessor and including a cache 40 and an 82385 cache controller 38, according to one embodiment.

The 82385 cache controller 38 of FIG. 2 is a high performance 32-bit peripheral for Intel's 80386 microprocessor 10 of FIGS. 1-4.

82385 OVERVIEW

The main function of a cache memory system including cache memory 40 its controller 38 is to provide fast local storage for frequency accessed code and data. The cache system intercepts 83086 memory references on bus 14 to see if the required data resides in the cache 40. If the data resides in the cache (a hit), it is returned to the 80386 microprocessor 10 via data bus 16 without incurring wait states. If the data is not cached (a miss), the reference is forwarded to the system via bus 32 and the data retrieved from main memory 36. An efficient cache will yield a high "hit rate" (the ratio of cache hits to total 80386 accesses), such that the majority of accesses are serviced with zero wait states. The net effect is that the wait states incurred in a relatively infrequent miss are averaged over a large number of accesses, resulting in an average of nearly zero wait states per access. Since cache hits are serviced locally, a processor operating out of its local cache has a much lower "bus utilization" which reduces system bus bandwidth requirements, making more bandwidth available to other bus masters.

Figure 3:
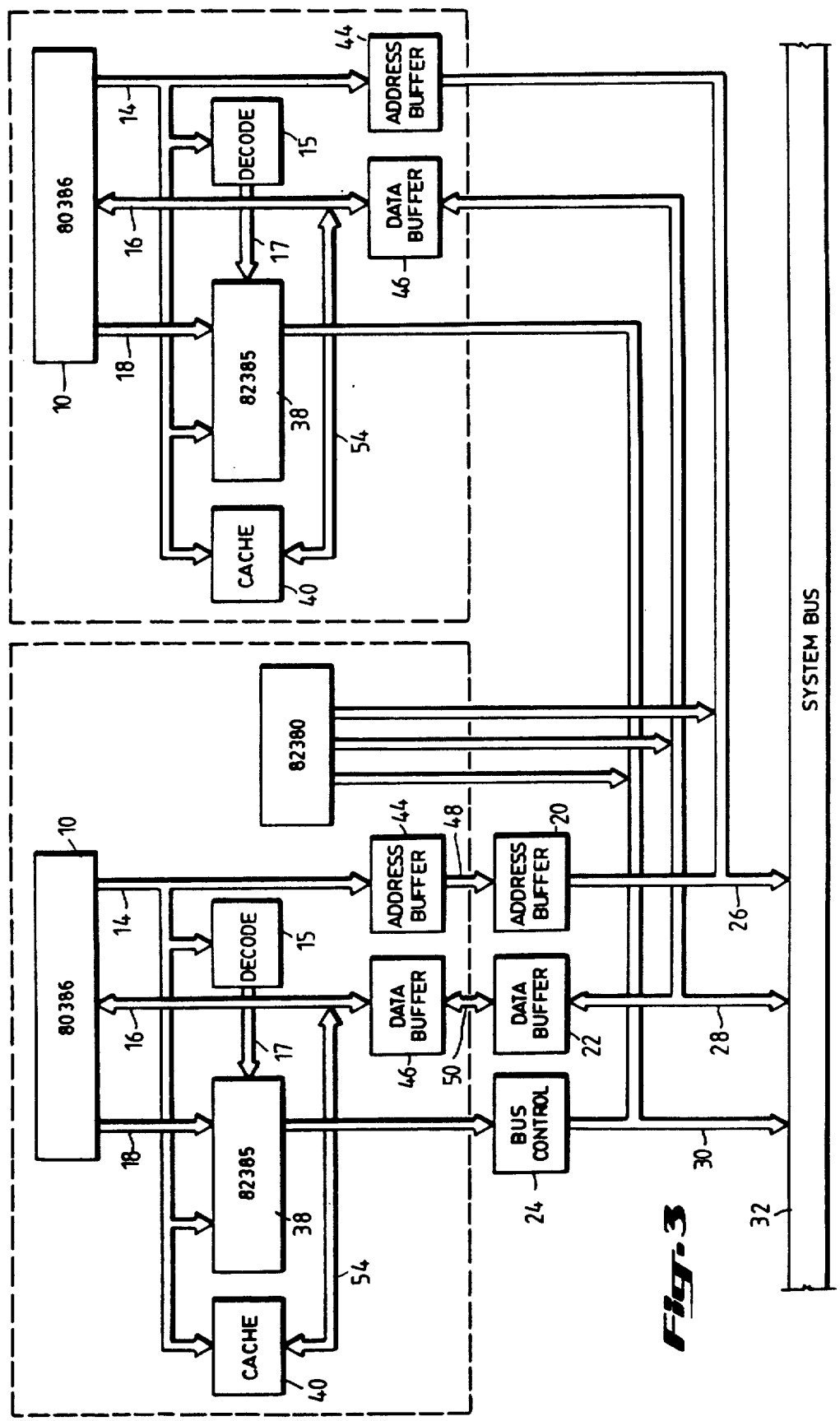
FIG. 3 is an electrical diagram in block form of a computer system and its bus structure using an 80386 microprocessor in which multiple 82385 cache controllers in slave mode share a common bus.

The 82385 cache controller 38 of FIGS. 2-4 integrates a cache directory 56 of FIGS. 6 or 8 and all cache management logic required to support an external 32Kbyte cache 40. The cache directory structure is such that the entire physical address range of the 80386 microprocessor 10. (4 gigabytes) is mapped into the cache directory 56. According to the invention, as will be described, provision is made to allow areas of memory to be set aside as non-cacheable. The user has two cache organization options: direct mapped of FIG. 6 and two-way set associative of FIG. 8. Both provide the high hit rates necessary to make a large, relatively slow main memory array 36 look like a fast, zero wait state memory to the 80386 microprocessor 10.

A good hit rate is an essential ingredient of a successful cache 40 implementation. Hit rate is the measure of how efficient a cache is in maintaining a copy of the most frequently requested code and data. However, efficiency is not the only factor for performance consideration. Just as essential are sound management policies. These policies refers to the handling of 80386 writes, preservation of cache coherency, and ease of system design. The 82385's "posted write" capability allows the majority of 80386 microprocessor 10 writes, including non-cacheable and I/O writes, to run with zero wait states, and the "bus watching" mechanism 55 of the cache controller 38 preserves cache coherency with no impact on system performance. Physically, the 82385 cache controller 38 ties directly to the 80386 microprocessor 10 with virtually no external logic.

SYSTEM OVERVIEW I: BUS STRUCTURE

A good grasp of the bus structure of an 80386/82385 system is essential in understanding both the 82385 cache controller 38 and its role in a system having an 80386 microprocessor 10. The following is a description of this structure.

80386 Local Bus/82385 Local Bus/System Bus

FIG. 1 depicts the bus structure of a typical 80386 system. The "80386 local bus 12" consists of the physical 80386 address, data, and control busses 14, 16 and 18. The local address and data busses 14 and 16 are buffered and/or latched to become the "system" address and data busses 26 and 28. The local control bus is decoded by bus control logic 24 to generate the various system bus read and write commands.

The addition of an 82385 cache controller 38 causes a separation of the 80386 bus into two distinct busses: the actual 80386 local bus 12 and the "82385 local bus 42" (FIG. 2). The 82385 local bus 42 is designed to look like the front end of an 80386 microprocessor 10 by providing 82385 local bus equivalents to all appropriate 80386 signals. The system bus 32 ties to this "80386-like" front end just as it would to an actual 80386. The 80386 microprocessor 10 simply sees a fast system bus, and the system bus 32 sees an 80386 front end with low bus bandwidth requirements. The cache subsystem including controller 38 and memory 40 is transparent to both. Note that the 82385 local bus 42 is not simply a buffered version of the 80386 bus 12, but rather is distinct from, and able to operate in parallel with the 80386 bus. Other masters residing on either the 82385 local bus 42 or system bus 32 are free to manage system resources while the 80386 microprocessor 10 operates out of its cache 40.

Bus Arbitration

The 82385 cache controller 38 presents the "80386-like" interface which is called the 82385 local bus 42. Whereas the 80386 microprocessor 10 provides a Hold Request/Hold Acknowledge bus arbitration mechanism via its HOLD and HLDA pins on control bus 18, the 82385 provides an equivalent mechanism via its BHOLD and BHLDA pins via bus 38. When another master requests the 82385 local bus 42, it issues the request to the 82385 via BHOLD. Typically, at the end of the current 82385 local bus cycle, the 82385 cache controller 38 will release the 82385 local bus 42 and acknowledge the request via BHLDA. The 80385 cache controller 38 is of course free to continue operating on the 80386 local bus 12 while another master owns the 82385 local bus 42.

Master/Slave Operation

The above 82385 local bus arbitration discussion is strictly true only when the 82385 cache controller 38 is programmed for "Master" mode operation. The user can, however, configure the 82385 cache controller 38 for "Slave" mode operation. (Programming is done via a hardware strap option.) The roles of BHOLD and BHLDA are reversed for an 82385 cache controller 38 in slave mode; BHOLD is now an output indicating a request to control the bus 32, and BHLDA is an input from bus 32 indicating that a request has been granted. An 82385 programmed in slave mode drives the 82385 cache controller 38 local bus 42 only when it has requested and subsequently been granted bus control. This allows multiple 80386/82385 subsystems to reside on the same 82385 local bus 42 (FIG. 3).

Cache Coherency

Ideally, a cache 40 contains a copy of the most heavily used portions of main memory 36. To maintain cache "coherency" is to make sure that this local copy is identical to the main memory 36. In a system where multiple masters can access the same memory, there is always a risk that one master will alter the contents of a memory location that is duplicated in the local cache of another master. (The cache is said to contain "stale" data.) One rather restrictive solution is to not allow cache subsystems to cache data in shared memory areas. Another simple solution is to flush the cache 40 anytime another master writes to system memory 36. However, this can seriously degrade system performance as excessive cache flushing will reduce the hit rate of what may otherwise be a highly efficient cache.

The 82385 cache controller 38 preserves cache coherency via "bus watching" (also called snooping), a technique that neither impacts performance nor restricts memory mapping. An 82385 cache controller 38 that is not currently bus master monitors system 32 bus cycles via snoop bus 55 of FIG. 4, and when a write cycle by another master is detected (a snoop), the system address is sampled and used to see if the referenced location is duplicated in the cache 40. If so (a snoop hit), the corresponding cache entry is invalidated, which will force the 80386 microprocessor 10 to fetch the up-to-date data from main memory 36 the next time it accesses this modified location. FIG. 4 depicts the general form of bus watching.

SYSTEM OVERVIEW II: BASIC OPERATION

This discussion is an overview of the basic operation of and 80386/82385 system. Items discussed included the 82385's of the cache controller 38 response to all 80386 microprocessor 10 cycles, including interrupt acknowledges, halts, and shutdowns. Also discussed are non-cacheable and local accesses.

80386 Memory Code and Data Read Cycles

Read Hits

When the 80386 microprocessor 10 initiates a memory code or data read cycle, the 82385 cache controller 38 compares the high order bits of the 80386 address bus 14 with the appropriate addresses (tags) stored in its on-chip directory 56 of FIGS. 6 or 8. If the 82385 cache controller 38 determines that the requested data is in the cache 40, it issues the appropriate control signals that direct the cache 40 to drive the requested data onto the 80386 data bus, where it is read by the 80386 microprocessor 10. The 82385 cache controller 38 terminates the 80386 cycle without inserting any wait states.

Read Misses

If the 82385 cache controller 38 determines that the requested data is not in the cache 40, the request is forwarded to the 82385 local bus and the data retrieved from main memory 36. As the data returns from main memory, it is directed to the 80386 microprocessor 10 and also written into the cache 40. Concurrently, the 82385 cache controller 38 updates the cache directory 56 such that the next time this particular piece of information is requested by the 80386 microprocessor 10, the 82385 cache controller 38 will find it in the cache 40 and return it with zero wait states.

The basic unit of transfer between main memory 36 and cache 40 memory in a cache subsystem is called the line size. In an 82385 system, the line size is one 32-bit aligned doubleword. During a read miss, all four 82385 local bus 42 byte enables are active. This ensures that a full 32-bit entry is written into the cache 40. (The 80386 microprocessor 10 simply ignores what it did not request.) In any other type of 80386 cycle that is forwarded to the 82385 local bus 42, the logic levels of the 80386 byte enables are duplicated on the 82385 local bus 42.

The 82385 cache controller 38 does not actively fetch main memory data independently of the 80386 microprocessor 10. The 82385 is essentially a passive device which only monitors the address bus 14 and activates control signals. The read miss is the only mechanism by which main memory data is copied into the cache 40 and validated in the cache directory.

In an isolated read miss, the number of wait states seen by the 80386 microprocessor 10 is that required by the system memory 36 to respond with data plus the cache comparison cycle (hit/miss decision). The cache system must determine that the cycle is a miss before it can begin the system memory 36 access. However, since misses most often occur consecutively, the 82385 cache controller 38 will begin 80386 address pipelined cycled to effectively "hit" the comparison cycle beyond the first miss.

The 82385 cache controller 38 can execute a main memory 36 access on the 82385 local bus 42 only if it currently owns the bus. If not, an 82385 cache controller 38 in master mode will run the cycle after the current master releases the bus. An 82385 cache controller 38 in slave mode will issue a hold request, and will run the cycle as soon as the request is acknowledge. (This is true for any read or write cycle that needs to run on the 82385 local bus 42.)

80386 Memory Write Cycles

The 82385's "posted write" capability allows the majority of 80386 microprocessor 10 memory write cycles to run with zero wait states. The primary memory update policy implemented in a posted write is the traditional cache "write through" technique, which implies that main memory 36 is always updated in any memory write cycle. If the referenced location also happens to reside in the cache 40 (a write hit), the cache 40 is updated as well.

Beyond this, a posted write latches the 80386 microprocessor 10 address, data, and cycle definition signals, and the 80386 local bus cycle is terminated without any wait states, even though the corresponding 82385 local bus 42 cycle is not yet completed, or perhaps not even started. A posted write is possible because the 82385's bus state machine, which is almost identical to the 80386 bus state machine, is able to run 82385 local bus 42 cycles independently of the 80386 microprocessor 10. The only time the 80386 sees wait states in a write cycle is when a previously latched write has not yet been completed on the 82385 local bus 42. An 80386 write can be posed even if the 82385 does not currently own the 82385 cache controller 38 local bus 42. In this case, an 82385 in master mode will run the cycle as soon as the current master releases the bus, and an 82385 cache controller 38 in slave mode will request the bus and run the cycle when the request is acknowledged. The 80386 microprocessor 10 is free to continue operating out of its cache 32 (on the 80386 local bus 42) during this time.

Non-Cacheable Cycles

Non-cacheable cycles fall into one of two categories: cycles decoded as non-cacheable, and cycles that are by default non-cacheable according to the 82385's design. All non-cacheable cycles are forwarded to the 82385 local bus 42. Non-cacheable cycles have no effect on the cache 40 or cache directory 56.

According to a primary feature of the invention, 82385 cache controller 38 allows the system designer to define areas of main memory 36 as non-cacheable. The 80386 address bus 14 is decoded by decoder 15 and the decode output is connected to the 82385's non-cacheable access (NCA#) input 17. This decoding is done in the first 80386 bus state in which the non-cacheable cycle address becomes available. Non-cacheable read cycles resemble cacheable read miss cycles, except that the cache 40 and cache directory 56 are unaffected. Non-cacheable writes, like all writes, are posted.

The 82385 cache controller 38 defines certain cycles as non-cacheable without using its non-cacheable access input 17. These include I/O cycles, interrupt acknowledge cycles, and halt/shutdown cycles. I/O reads and interrupt acknowledge cycles execute as any other non-cacheable read. I/O write cycles and halt/shutdown cycles, as with other non-cacheable writes, are posted. During a halt/shutdown condition, the 82385 local bus 42 duplicates the behavior of the 80386 microprocessor 10, including the ability to recognize and respond to a BHOLD request. (The 82385's bus watching mechanism is functional in this condition.)

16-Bit Memory Space

The 82385 cache controller 38 does not cache 16-bit memory space (as decoded by the 80386 microprocessor 10 BS16# input), but does make provisions to handle 16-bit space as non-cacheable. (There is no 82385 equivalent to the 80386 BS16# input.) In a system without an 82385 cache controller 38, the 80386 microprocessor 10 BS16# input need not be asserted until the last state of a 16-bit cycle for the 80386 microprocessor 10 to recognize it as such (unless NA# is sampled active earlier in the cycle). The 82385 cache controller 38, however, needs this information earlier, specifically at the end of the first 80386 bus state in which the address of the 16-bit cycle becomes available. The result is that in a system without an 82385 cache controller 38, 16-bit devices can inform the 80386 microprocessor 10 that they are 16-bit devices "on the fly," while in a system with an 82385 cache controller 38, devices decoded as 16-bit (using the 80386 BS16#) must be located in address space set aside for 16-bit devices. If 16-bit space is decoded according to 82385 cache controller 38 guidelines, then the 82385 will handle the 16-bit cycles just like the 80386 microprocessor 10 does, including effectively locking the two halves of a non-aligned 16-bit transfer from interruption by another master.

80386 Local Bus Cycles 80386 local bus 12 cycles are accesses to resources on the 80386 local bus 12 rather than to the 82385 cache controller 38 itself. The 82385 cache controller 38 simply ignores these accesses: they are neither forwarded to the system nor do they affect the cache 40. The designer sets aside memory and/or I/O space for local resources by decoding the 80386 address bus 14 and feeding the decode to the 82385's local bus access (LBA#) input. The designer can also decode the 80386 cycle definition signals on control bus 18 to keep specific 80386 microprocessor 10 cycles from being forwarded to the system. For example, a multi-processor design may wish to capture and remedy an 80386 microprocessor 10 shutdown locally without having it detected by the rest of the system. Note that in such a design, the local shutdown cycle must be terminated by local bus control logic. The 80387 Numerics Coprocessor is considered an 80386 local bus 12 resource, but it need not be decoded as such by the user since the 82385 cache controller 38 is able to internally recognize 80387 accesses via the M/IO# and A31 pins.

Summary of 82385 Response to All 80386 Cycles

FIG. 5 summarizes the 82385 cache controller 38 response to all 80386 microprocessor 10 bus cycles, as conditioned by whether or not the cycle is decoded as local or non-cacheable. The figure describes the impact of each cycle on the cache 40 and on the cache directory 56, and whether or not the cycle is forwarded to the 82385 local bus 42. Whenever the 82385 local bus is marked "IDLE," it implies that this bus is available to other masters.

Bus Watching

As previously discussed, the 82385 cache controller 38 "qualifies" an 80386 microprocessor 10 bus cycle in the first bus state in which the address and cycle definition signals of the cycle become available. The cycle is qualified as read or write, cacheable or non-cacheable, etc. Cacheable cycles are further classified as hit or miss according to the results of the cache comparison, which accesses the 82385 directory 56 and compares the appropriate directory location (tag) to the current 80386 microprocessor 10 address. If the cycle turns out to be non-cacheable or a 80386 local bus access, the hit/miss decision is ignored. The cycle qualification requires one 80386 state. Since the fastest 80386 access is two states, the second state can be used for bus watching.

When the 82385 cache controller 38 does not own the system bus 32, it monitors system bus cycles. If another master writes into main memory 36, the 82385 cache controller 38 latches the system address and executes a cache look-up to see if the altered main memory location resides in the cache 40. If so (a snoop hit), the cache entry is marked invalid in the cache directory 56. Since the directory 56 is at most only being used every other state to qualify 80386 accesses, snoop look-ups via bus 55 are interleaved between 80386 local bus 12 look-ups. The cache directory 56 is time multiplexed between the 80386 address on bus 14 and the latched system address on bus 32. The result is that all snoops are caught and serviced without slowing down the 80386 microprocessor 10, even when running zero wait state hits on the 80386 local bus 12.

Cache Flush

The 82385 cache controller 38 offers a cache flush input. When activated, this signal causes the 82385 cache controller 38 to invalidate all data which had previously been cached. Specifically, all tag valid bits are cleared. Therefore, the cache 40 is effectively empty and subsequent cycles are misses until the 80386 microprocessor 10 begins repeating the new accesses (hits). The primary use of the FLUSH input is for diagnostics and multi-processor support.

82385 CACHE ORGANIZATION

The 82385 supports two cache organizations: a simple direct mapped organization and a slightly more complex, higher performance two-way set-associative organization. The choice is made by strapping an 82385 input (2W/D#) either high or low.

DIRECT MAPPED CACHE

Direct Mapped Cache Structure and Terminology

FIG. 6 depicts the relationship between the 82385's internal cache directory 56, the external cache memory 40, and the 80386's 4 gigabyte physical address space 60. The 4 gigabytes can conceptually be thought of as cache "pages" each being 8K doublewords (32Kbytes) deep. The page size matches the cache 40 size. The cache 40 can be further divided into 1024 (0 through 1023) sets of eight doublewords (8×32 bits). Each 32-bit doubleword is called a "line." The unit of transfer between the main memory 36 and cache 40 is one line.

Each block in the external cache 40 has an associated 26-bit entry 61 in the 82385's internal cache directory 56. This entry has three components: a 17-bit "tag," a "tag valid" bit, and eight "line valid" bits. The tag acts as a main memory 36 page number (17 tag bits support $2^{17}$ pages). For example, if line 9 of age 2 currently resides in the cache 40, then a binary 2 is stored in the Set 1 tag field. (For any 82385 cache controller 38 direct mapped cache 40 page in main memory 36, Set 0 consists of lines 0–7, Set 1 consists of lines 8–15, etc. Line 9 is shaded in FIG. 6.) An important characteristic of a direct mapped cache is that line 9 of any page can only reside in line 9 of the cache 40. All identical page offsets map to a single cache location.

The data in a cache set is considered valid or invalid depending on the status of its tag valid. If clear, the entire set is considered valid. If true, an individual line within the set is considered valid or invalid depending on the status of its line valid bit.

The 82385 cache controller 38 sees the 80386 address bus 14 (A2–A31) as partitioned into three fields: a 17-bit "tag" field (A15–A31), a 10-bit "set-address" field (A5–A14), and a 3-bit "line select" field (A2–A4). (See FIG. 7.) The lower 13 address bits (A2–A14) also serve as the "cache address" which directly selects one of 8K doublewords in the external cache 40.

Direct Mapped Cache Operation

The following is a description of the interaction between the 80386 microprocessor 10, cache 40, and cache directory 56.

Read Hits

When the 80386 microprocessor 10 initiates a memory read cycle, the 82385 cache controller 38 uses the 10-bit set address to select one of 1024 directory entries 61, and the 3-bit line select field to select one of eight line valid bits 62 within the entry 61. The 13-bit cache address 63 selects the corresponding doubleword in the cache 40. The 82385 cache controller 38 compares the 17-bit tag field (A15–A31 of the 80386 access of FIG. 7) with the tag stored in the selected directory entry 61. If the tag and upper address bits match, and if both the tag and appropriate line valid bits are set, the result is a hit, and the 82385 directs the cache 40 to drive the selected doubleword onto the 80386 data bus 16. A read hit does not alter the contents of the cache 40 or directory 56.

Read Misses

A read miss can occur in two ways. The first is known as a "line" miss, and occurs when the tag and upper address bits match and the tag valid bit is set, but the line valid bit is clear. The second is called a "tag" miss, and occurs when either the tag and upper address bits do not match, or the tag valid bit 63 is clear. (The line valid bit is a "don't care" in a tag miss.) In both cases, the 82385 cache controller 38 forwards the 80386 microprocessor 10 reference to the system, and as the returning data is fed to the 80386, it is written into the cache 40 and validated in the cache directory 56.

In a line miss, the incoming data is validated simply by setting the previously clear line valid bit 63. In a tag miss, the upper address bits overwrite the previously stored tag, the tag valid bit is set, the appropriate line valid bit is set, and the other seven line valid bits are cleared. Subsequent tag hits with line misses will only set the appropriate line valid bit. (Any data associated with the previous tag is no longer considered resident in the cache 40.)

Other Operations That Affect The Cache and Cache Directory

The other operations that affect the cache 40 and/or directory 56 are write hits, snoop hits, cache flushes, and 82385 resets. In a write hit, the cache 40 is updated along with main memory 36, but the directory 56 is unaffected. In a snoop hit, the cache 40 is unaffected, but the affected line is invalidated by clearing its line valid bit in the directory 56. Both an 82385 reset and cache flush clear all tag valid bits.

When and 80386/82385 system "wakes up" upon reset, all tag valid bits 63 are clear. At this point, a read miss is the only mechanism by which main memory data is copied into the cache 40 and validated in the cache directory 56. Assume an early 80386 code access seeks (for the first time) line 9 of page 2. Since the tag valid bit is clear, the access is a tag miss, and the data is fetched from main memory 36. Upon return, the data is fed to the 80386 microprocessor 10 and simultaneously written into line 9 of the cache 40. The set directly entry is updated to show this line as valid. Specifically, the tag and appropriate line valid bits are set, the remaining seven line valid bits 63 cleared, and a binary 2 written into the tag. Since code is sequential in nature. The 80386 microprocessor 10 will likely next want line 10 of page 2, then line 11, and so on. If the 80386 microprocessor 10 sequentially fetches the next six lines, these fetches will be line misses, and as each is fetched from main memory 36 and written into the cache 40, its corresponding line valid bit is set. This is the basic flow of events that fills the cache 40 with valid data. Only after a piece of data has been copied into the cache 40 and validated can it be accessed in a zero wait state read hit. Also a cache entry must have been validated before it can be subsequently altered by a write hit, or invalidated by a snoop hit.

An extreme example of "thrashing" is if line 9 of page two in an instruction to jump to line 9 of page one, which is an instruction to jump back to line 9 of page two. Thrashing results from the direct mapped cache characteristic that all identical page offsets map to a single cache location. In this example, the page one access overwrites the cached page two data, and the page two access overwrites the cached page one data. As long as the code jumps back and forth the hit rate is zero. This is of course an extreme case. The effect of thrashing is that a direct mapped cache 40 exhibits a slightly reduced overall hit rate as compared to a set-associative cache 40 of the same size.

TWO-WAY SET ASSOCIATIVE CACHE

Two-Way Set-Associative Cache Structure and Terminology

FIG. 8 illustrates the relationship between the directory 56, cache 40, and 4 gigabyte address space.

Figure 9:
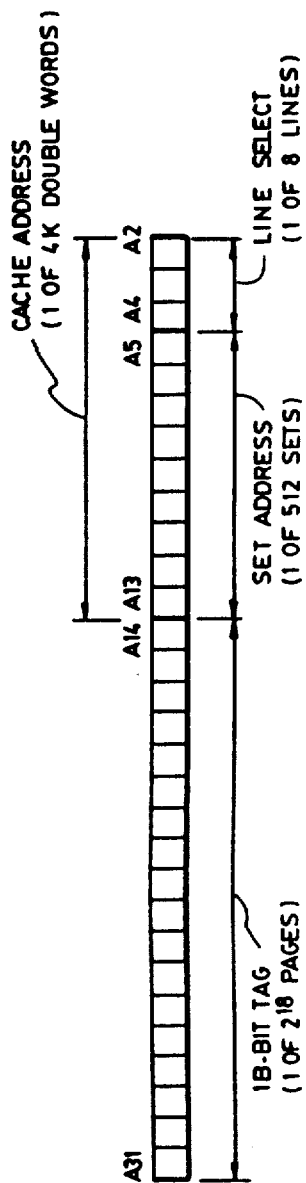
FIG. 9 is a diagram of a 32-bit word on the 80386 address bus for a two-way set associative cache of FIG. 8.

Whereas the direct mapped cache of FIG. 6 is organized as one bank of 8K doublewords, the two-way set-associative cache 40 of FIG. 8 is organized as two banks (A and B) of 4K doublewords each. The page size is halved, and the number of pages doubled (Note the extra tag bit.) The cache 40 now has 512 sets in each bank. (Two banks times 512 sets gives a total of 1024. The structure can be thought of as two half-sized direct mapped caches in parallel.) The performance advantage over a direct mapped cache is that all identical page offsets map to two cache locations instead of one, reducing the potential for thrashing. The 82385's partitioning of the 80386 address bus 14 is depicted in FIG. 9.

LRU Replacement Algorithm

The two-way set-associative directory 56 has an additional feature: the "least recently used" or LRU bits 64. In the event of a read miss, either bank, A or bank B will be updated with new data. The LRU bit 64 flags the candidate for replacement. Statistically, of two blocks of data, the block most recently used is the block most likely to be needed again in the near future, By flagging the least recently used block, the 82385 cache controller 38 ensures that the cache block replaced is the least likely to have data needed by the CPU 10.

TWO-WAY SET-ASSOCIATIVE CACHE OPERATION

Read Hits

When the 80386 microprocessor 10 initiates a memory read cycle, the 82385 cache controller 38 uses the 9-bit set address to select one of 512 sets. The two tags of this set are simultaneously compared with A14–A31, both tag valid bits checked, and both appropriate line valid bits checked. If either comparison produces a hit, the corresponding cache 40 bank is directed to drive the selected doubleword onto the 80386 data bus 16 via bus 54. (Note that both banks will never concurrently cache the same main memory 36 location.) If the requested data resides in bank A, the LRU bit 64 is pointed toward B. If B produces the hit, the LRU bit 64 is pointed toward A.

Read Misses

As in direct mapped operation, a read miss can be either a line or tag miss. Let's start with a tag miss example. Assume the 80386 microprocessor 10 seeks line 9 of page 2, and that neither the A nor B directly produces a tag match. Assume also, as indicated in FIG. 8, that the LRU bit points to A. As the data returns from main memory 36, it is loaded into offset 9 of bank A. Concurrently, this data is validated by updating the set 1 directory entry for bank A. Specifically, the upper address bits overwrite the previous tag, the tag valid bit is set, the appropriate line valid bit is set, and the other seven line valid bits cleared. Since this data is the most recently used, the LRU bit is turned toward B. No change to bank B occurs.

If the next 80386 microprocessor 10 request is line 10 of page two, the result will be a line miss. As the data returns from main memory 36, it will be written into offset 10 of bank A (tag hit/line miss in bank A), and the appropriate line valid bit will be set. A line miss in one bank will cause the LRU bit to point to the other bank. In this example, however, the LRU bit has already been turned toward B.

Other Operations That Affect The Cache And Cache Directory

Other operations that affect the cache 40 and cache directory 56 are write hits, snoop hits, cache 40 flushes, and 82385 cache controller 38 resets. A write hit updates the cache along with main memory 36. If directory A detects the hit, bank A is updated. If directory B detects the hit, bank B is updated. If one bank is updated, the LRU bit is pointed toward the other.

If a snoop hit invalidates an entry, for example, in cache bank A, the corresponding LRU bit is pointed toward A. This ensures that invalid data is the prime candidate for replacement in a read miss. Finally, resets and flushes behave just as they do in a direct mapped cache 40, clearing all tag valid bits.

82385 PIN DESCRIPTION

The 82385 creates the 82385 cache controller 38 local bus 42, which is a functional 80386 interface. To facilitate understanding 82385 local bus signals go by the same name as their 80386 microprocessor 10 equivalents, except that they are preceded by the letter "B". The 82385 local bus equivalent to ADS# is BADS#, the equivalent to NA# is BNA#, etc. This convention applies to bus states as well. For example, BT1P is the 82385 local bus 42 state equivalent to the 80386 T1P state.

80386 LOCAL BUS DECODE INPUTS

These 82385 inputs are generated by decoding the 80386 microprocessor 10 address and cycle definition lines. These active low inputs are sampled at the end of the first state in which the address of a new 80386 cycle becomes available (T1 or first T2P).

80386 Local Bus Access (LBA#)

This input identifies an 80386 access as directed to a resource (other than the cache 40) on the 80386 microprocessor 10 local bus 12. (The 80387 Numeric Coprocessor is considered an 80386 local bus 12 resource, but LBA# need not be generated as the 82385 cache controller 38 internally decodes 80387 accesses.) The 82385 simply ignores these cycles. They are neither forwarded to the system nor do they affect the cache 40 or cache directory 56. Note that LBA# has priority over all other types of cycles. If LBA# is asserted, the cycle is interpreted as an 80386 local bus access, regardless of the cycle type or status of NCA# or X16#. This allows any 80386 cycle (memory, I/O, interrupt acknowledge, etc.) to be kept on the 80386 local bus 12 if desired.

Non-Cacheable Access (NCA#)

This active low input identifies an 80386 microprocessor 10 cycle as non-cacheable. The 82385 cache controller 38 forwards non-cacheable cycles to the 82385 local bus and runs them. The cache and cache directory are unaffected.

NCA# allows a designer to set aside a portion of main memory as non-cacheable. Potential applications include memory-mapped I/O and systems where multiple masters access dual ported memory via different busses. Another possibility makes use of an 80386 D/C# output. The 82385 cache controller 38 by default implements a unified code and data cache, but driving NCA# directly by D/C# creates a data only cache. If D/C# is inverted first, the result is a code only cache.

80386 LOCAL BUS INTERFACE

The following is a detailed description of how the 82385 cache controller 38 interfaces to the 80386 microprocessor 10 and to 80386 local bus resources. Items specifically addressed are the interfaces to the 80386 microprocessor 10, the cable SRAM's, and the 80387 Numeric Coprocessor.

Figure 10:
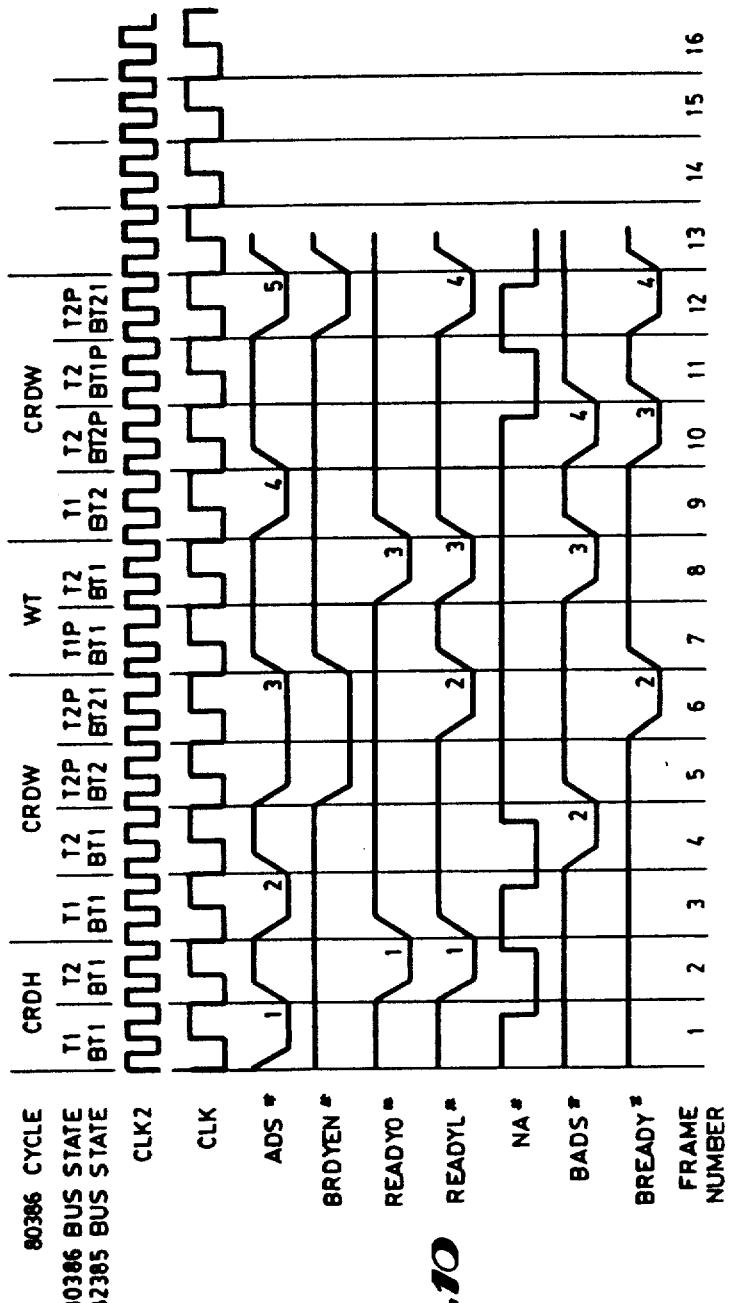
FIG. 10 is a timing diagram illustrating an 80386 bus cycle in the system of FIG. 2, for example.

The timing diagrams of FIGS. 10 and 12 provide insight into the dual pipelined bus structure of an 80386/82385 system. It's important to realize, however, that one need not know every possible cycle combination to use the 82385 cache controller 38. The interface is simple, and the dual bus operation invisible to the 80386 microprocessor 10 and system. To facilitate discussion of the timing diagrams, several conventions have been adopted. Refer to FIG. 10, and note that 80386 bus cycles, 80386 bus states, and 82385 bus states are identified along the top. All states can be identified by the "frame numbers" along the bottom. The cycle in FIG. 10 include a cache read hit (CRDH), a cache read miss (CRDM), and a write (WT). WT represents any write, cacheable or not. When necessary to distinguish cacheable writes, a write hit goes by CWTH and a write miss by CWTM. Non-cacheable system reads go by SPRD. Also, it is assumed that system bus 32 pipelining occurs even though the BNA# signal is not shown. When the system pipeline begins is a function of the system bus controller.

80386 microprocessor 10 bus cycles can be tracked by ADS# and READYI#, and 82385 cycles by BADS# and BREADY#. These four signals are thus a natural choice to help track parallel bus activity. Note in the timing diagrams that 80386 microprocessor 10 cycles are numbered using ADS# and READYI#, and 82385 cycles using BADS# and BREADY#. For example, when the address of the first 80386 cycle becomes available, the corresponding assertion of ADS# is marked "1", and the READYI# pulse that terminates the cycle is marked "1" as well. Whenever an 80386 cycle is forwarded to the system, its number is forwarded as well so that the corresponding 82385 bus cycle can be tracked by BADS# and BREADY#.

The "N" value in the timing diagrams is the assume number of main memory 36 wait states inserted in a non-pipelines 80386bus cycle. For example, a non-pipelined access to N=2 memory requires a total of four bus states, while a pipelined access requires three. (The pipeline advantage effectively hides one main memory wait state.)

PROCESSOR INTERFACE

This section presents the 80386/82385 hardware inter face and discusses the interaction and timing of this interface. Also addressed is how to decode the 80386 microprocessor 10 address bus 14 to generate the 82385 cache controller 38 inputs.

LBA#, NCA#, and X16# Generation

The 82385 input signals LBA#, NCA#, and X16# are generated by decoding the 80386 microprocessor 10 address (A2–A31) and cycle definition (W/R#, D/C#, M/IO#) lines. The 82385 cache controller 38 samples them at the end of the first state in which they become available, which is either T1 or the first T2P cycle. The decode configuration and timings are illustrated respectively in FIGS. 11 and 12.

CACHE

Description of Cache System

For a complete description of the cache system, consult the Intel 82385 cache controller Data Book.

A cache is a method of using a small amount of fast memory 40 for holding the data from a larger, slower memory 36. To describe it's operation, a very simple cache system will be explained.

If the cache 40 was the same size as the main memory 36, then the operation of the cache would go as follows: as the CPU 10 reads a word, the cache controller 38 would check a "valid" bit for that location, and notice that the location was not yet a copy of the corresponding memory. The controller 38 would then read the corresponding memory 36, copy it's data to the cache RAM 40 and send the data to the CPU 10. This process (copying the data to cache RAM 40) is called a "miss" because the data is not in the cache RAM.

The CPU 10 would then go on to read other data, with the same results, until eventually, the "valid" bit would indicate that the cache 40 contains the data desired. At this time, the cache 40 would then just send it's data back to the CPU 10 without reading the main memory 36. This is referred to as a "hit".

As time goes on, in this simple cache 40, eventually all locations of main memory 36 would be copied to the cache 40 and the CPU 10 would then receive all of it's data from the cache 40. At this time, the CPU would be able to operate much faster than with the slower main memory 36.

Even in this simple system, there is the problem of what to do if the CPU 10 writes something new to memory. Several things are possible, but the most common is to write to both the cache 40 memory 36 and the main memory at the same time. The cache 40 memory should only be updated if the cache 40 contains the data for that location already as determined by the valid bit. This prevents partial writes (byte out of a word, for example) from causing the cache 40 to contain incomplete data. The insuring that the cache 40 always reflects the actual state of main memory 36 is called "coherency".

Since the CPU 10 generally does not do several writes one right after the other, it is possible for our cache system to remember the operation to main memory 36 at leisure. This is possible because the CPU 10 will generally be doing reads after the write, which can be satisfied from the cache memory 40, allowing the main memory update to be done in parallel. This type of operation is called "posted write". These generalities are useful in improving the performance of the system, however, the cache controller 38 must be prepared to slow down and finish things in sequence if the CPU 10 does not play the game right.

This "simple" system is prohibitively too expensive to build (requiring as much fast SRAM as main RAM) so cache designers add complexity to save fast memory. The usual method is to reduce the amount of SRAM and to remember what address from the CPU 10 goes with each data element in the SRAM. In this way, when the CPU asks for data, the cache 40 can scan all of the stored addressed to determine if it can supply the data. If not, the cache can pick a element to use and store the new address and data. Since the cache 40 is now smaller than main memory 36, the element picked will almost certainly overwrite an already valid element thereby reducing performance.

As you can see, a cache smaller than main memory 36 involves many design tradeoffs. Not discussed here is the specific design used in the D5 processor board.

Terminology

"Line"—the smallest piece of data that the cache system an deal with.

"Tag"—the information stored with the data that indicates it's present status; address, valid etc.

"Block"—the amount of data associated with each tag in the cache 40.

"Ways"—the number of independent cache tag groups (sets); such that data from different parts of memory can be guaranteed to be stored in the cache 40. A direct mapped cache (1 way) can only guarantee one of several data items to be cached, an "N way" cache can guarantee up to "N" items. More than one "way" requires an associative type of memory for the address lookup, that is the address lookup must be done in parallel in each of the "ways".

"Valid"—the bit which indicates the data associated is up to date.

"Hit"—means the cache 40 contains a copy of the data for a given address. For cache reads, the data is supplied by the cache, for writes, the cache data is generally updated.

"Miss"—means the cache 40 does not contain a copy of the data for a given address. For cache reads, the data must be read from main memory 36, for writes, nothing happens.

"LRU"—Least Recently Used. A method of picking which of the "ways" should be re-used when several choices are possible. The one used least recently is chosen. This generally keeps only the freshest data in the cache 40.

"Posted Write"—the saving of the write address and data from the CPU 10 and allowing the CPU to continue while the write operation occurs whenever the system bus 32 is not busy.

"Non Cachable Address"—the action of passing the memory address directly through to the system bus 32 instead of caching it in any way. This prevents memory mapped I/O devices from working incorrectly.

"Coherency"—the cache 40 is "coherent" when the cache data for a given main memory address is either the same or marked invalid. The cache 40 is not coherent, if, for some reason, the cache data is different than main memory.

"Flush"—this means to invalidate the entire contents of the cache 40 at one time. This is generally done by clearing the valid bits to the invalid state. "Flushing" is useful for insuring coherency of the cache after some operation occurs which may change the state of main memory 36. This does have the side effect of lowering performance by requiring the reloading of the cache by many misses.

"Bus Watching"—is used to monitor the activity on the system bus 32 which is Not generated by the cache controller 38. This activity includes DMA or other bus masters. If one of these things changes the state of a memory location, then, if the location is in the cache 40, the corresponding cache valid bit is cleared to the invalid state. This prevents the cache from becoming incoherent.

The D5 processor cache system consists of an Intel 82385 cache controller 38, 32kbytes of fast static RAM as the cache 40, SRAM data buffers, system bus data buffer/latches, and system bus address latches. These elements are organized into a two-way set associative cache 40 as follows;

2 ways of 4k × 32 bits
512 tags(blocks)/way (each tag controls a block)
8 lines/tag(block) (each block contains 8 lines)
4 bytes/line (32 bits)

The cache controller 38 deals with the CPU 10 directly and treats the rest of the system just as the CPU 10 would. That is, the controller 38 looks, to the rest of the system, just like a CPU 10.

The data stored by the cache 40 is stored in the 2×4k×32 SRAM. The address information matching the data is stored internal to the 82385 cache controller chip 38. Each of the 1024 tags (2×512) contains 18 address bits to match (for the block), and 8 valid bits (one for each line). The CPU address goes into the cache 40 as follows;

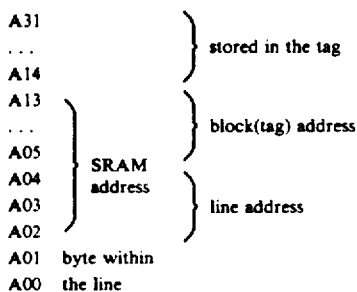

In this system the tag "covers" 32 bytes; 8 lines of 4 bytes each. On a CPU 10 read, the cache 40 has the opportunity to miss on either the tag address contents (if the block is not there at all) or on the specific line within the block.

On memory writes, the cache writes both the main memory and the cache 40 (if the corresponding tag and line are valid).

The system also implements "posted write" on ALL write cycles, both memory and I/O. This uses the external address latches to store the address and status, and external latch/buffers to store the data. The cache controller 38 produces the ADS* and turns on these latches to the system bus when appropriate.

A Least Recently Used (LRU) bit within the cache controller 38 is kept and used to determine which of the two "ways" to modify on a cache miss.

The cache system implements "Bus Watching" to prevent coherency problems. If DMA or other bus master writes to memory occur, then the corresponding cache valid bit is cleared. This is implemented by feeding the system address bus (A<31:2>) to the 82385 watch bus and strobing memory writes during HOLD cycles to the 82385. The CBI provides the SSTB* line to the 82385 for this function.

The cache system is flushed automatically any time the state of the LOWA20 line from the SMAP changes. It can also be flushed by a memory write to address 80C00000h the DIAGNOSTIC port on the memory board. The memory board decodes the address for the port and sends this information back to the CBI. The logic for the FLUSH is located in the CBI. When the cache 40 is to be flushed, the CBI generates a pulse 8 CLK40 cycles long as is required by the 82385.

The cache system is designed to not respond to several devices which are located on the CPU's local bus. For this system these are the 80387 or Weitek coprocessor. The decode logic for the 80387 is internal to the 82385 so that the cache controller 38 does nothing at all for coprocessor cycles. The decode logic for the Weitek is located externally in the D5-SNCA PAL. This PAL decodes address C0000000h-DFFFFFFFh and asserts the signal LBA*. The cache controller 38 reacts to this signal the same as it does to 80387 cycles, that is it does not react at all.

In order for the system expansion bus to allow the implementation of memory mapped I/O devices or memory boards which use a paged addressing scheme (LIM boards) certain addresses are marked to be noncachable. These are indicated below:

00040000h-0007FFFFh (when only 256k of base memory is set)
00040000h-0009FFFFh (when only 512k of base memory is set)
000A0000h-000DFFFFh at all times.
00FE0000h-00FFFFFFh (when ROM copy is enabled)
80000000h-FFFFFFFFh at all times.

The cache may be turned off for diagnostic purposes by setting bit 6 in the word at memory address 80C00002h to a 0. Other bits in this word are used for other things (see memory descriptions) and should not be changed.

The noncachable address decode logic is implemented in the D5-SNCA PAL which decodes the CPU address and generates the signal NCA*. This decode is done very quickly (9 nsec) in order to meet the 82385 controller 38 setup requirements.

Cache System Oddities

The cache controller 38 by design has several side effects to it's operation. The first of the side effects is caused by the reaction of the cache to nonexistent or write protected memory. Since the cache assumes that main memory 36 is normal RAM, it is possible for the cache to "fake out" software that attempts to write to nonexistent or write protected memory. This can happen if some software first reads a location, (loading the cache and setting the valid bit), writes a new value to the location (updating the cache entry but not the nonexistent or write protected real memory), and then reads the new value again. The cache 40 will return the value written, even though the main memory would not.

Another side effect of the cache system is the effect of the "posted write" logic. Since this logic will allow the CPU 10 to continue processing in parallel with activity on the system bus, the magic "JMP $+2" often used to add delays between I/O cycles may have no effect. This can cause problems in working with slow devices on the I/O bus. To help alleviate this problem, the CBI has been given logic to add some delay between I/O cycles on the system bus. This logic assures at least 1.5 usec of delay after any 8 bit I/O cycle before another I/O cycle can start. Sixteen bit I/O cycles do not start a delay and memory cycles on the expansion bus are not affected by this delay.

Note that devices which require more than 1.5 usec of time between cycles may require some special coding technique. On method that is suggested is to read or write some other location in the I/O space to add the required delay (a read of I/O port 084h is always safe). The system guarantees that all I/O operations and memory writes will happen in sequence although memory reads may occur from the cache 40 (thus not appearing at all on the bus 32).

Fail-Safe Ready Logic

Because there, are two devices located on the local bus 12 of the CPU 10 which are not connected to the cache controller 38, it would be possible for the system to hang if these devices were accessed and they were not installed to respond. To prevent this problem, the CBI includes logic to generate a ready signal (XRDY*) whenever one or both of these devices is accessed and does not respond. This logic uses the CPU's PA31, PA30, PA29, PM-IO and PADS* signals as well as the WIN* (Weitek Installed) line and the NCPIN* line to generate the ready signal. The WIN* line is provided directly by the Weitek 1167 when the part is installed. The NCPIN* comes from the processor board SW1-2 switch which therefore must be set correctly to prevent a hang.

Cache Controller Address Handling

The following information is applicable to nearly all the cycle types. When the Cache controller 38 begins a bus cycle, it begins by placing an address and status on it's bus 52. This address will usually come out even while the previous cycle is still in progress. Since most devices except to see a valid address for the duration of a bus cycle, it is necessary to latch the address seen by the system bus 32. System bus lines that contain the latched address are SA<19:0>. Since some devices (notably high speed memory) are already short on time to do their thing, they would like to overlap some of their operations (like address decode) with others. To allow this, the system bus 32 also provides a set of address lines LA<23:17> which are not latched but which can provide a greater setup time to do decoding. The typical usage of these lines is to do the address decoding whenever the address changes, and then latch the decoded outputs.

To provide the unlatched addresses, the board contains buffer IC's which are connected to the Cache Controller's A<23:17> address lines and provide LA<23:17> as an output.

To provide the latched addresses, the board contains latch IC's which are connected to the Cache Controller's A<19:2> and provide SA<19:2> as an output. These latches are of the fallthrough type so that when the address latch enable signal (XALE) goes active the address appears at the output. When XALE goes inactive, the addresses will stay on the outputs until the next bus cycle begins.

The address lines SA0 and SA1 are handled differently. The Cache Controller 38 indicates which bytes are to be accessed out of the 32 bit dword by the status lines BE3* to BE0* or Bus Enable three through zero. The system bus 32 conversion state machine takes these status lines and the current bus state and sequences to the appropriate bus state. The output of this state machine are the address lines SA0, SA1 and BHE*.

The signal BHE* is used on the system bus 32 to indicate that the high half of the 16 bit data bus contains valid data.

These signals (SA0, SA1 and BHE*) are changed at the rising edge of XALE so that their timing is very similar to the other SA<19:2> address lines.

All of the address outputs listed above are disabled when the Cache Controller 38 responds to a hold request (BHLDA) so that another device can control the address bus. When this occurs, the address lines are fed back to the Cache Controller bus (A<23:2> and BE<3:0>) so that the 32 bit memory board can receive the address data from that other device. The feed back operation occurs from the SA<16:0> and the LA<23:17> lines through buffers and the CBI for SA0, SA1 and BHE*.

Cache Controller address line A20 is handled a little differently. Because of software compatibility considerations (with 8088 products) it is sometimes necessary to restrict program access to the bottom megabyte of memory. This is done by disconnecting the PA20 line from the bus and forcing a low in it's place (by means of a 74F253). This is controlled by the line LOWA20 from the keyboard controller system. To equalize the delay with the other address lines, the output of the 74F253 is used to directly drive the LA20 line instead of being buffered again by a 74LS245.

Bus Architecture

In typical business applications, most CPU cycles are associated with the transfer of data to and from the CPU 10. This dependency of the CPU 10 on effective data transfers for instructions and general data means that the memory subsystem performance significantly impacts most applications. As a result, the X-15 system architecture, focuses on optimizing data transfers to and from the CPU 10. As CPU architectures progressed from a 16-bit, 4.77-MHz 8088 to a 32-bit, pipelined, 20-MHz 80386, the system and memory architectures had to keep pace. A fast, sophisticated CPU provides little value without an accompanying memory architecture that can match it.

Since the early days of the COMPAQ DESKPRO development, Compaq has recognized the need for high speed CPU data transfers. Compaq used very-large-scale integration (VLSI) components to implement a dual-bus architecture that is used in several products including the COMPAQ PORTABLE III, the 12-MHz COMPAQ DESKPRO 286, the 20-MHz COMPAQ Lynx, and the 16-MHz COMPAQ DESKPRO 386.

This dual-bus architecture allows the memory bus to operate at the full clock rate of the CPU and supports an I/O bus compatible with the numerous industry-standard peripherals. Increasing the speed of the memory bus significantly improves system performance without needlessly affecting the compatibility of I/O bus operations that are not speed critical. The COMPAQ X-15 required a major step in the evolution of the dual-bus architecture to maintain the balanced relationship between the CPU, memory, and I/O bus operations required for optimum system performance. As used herein, the "COMPAQ X-15" denotes a preferred embodiment comprising an Intel 80386 CPU 10 operating at 20 MHz and having an Intel 82385 cache-controller 38 with 32kbytes of high speed static RAM as a memory cache 40.

Figure 13:
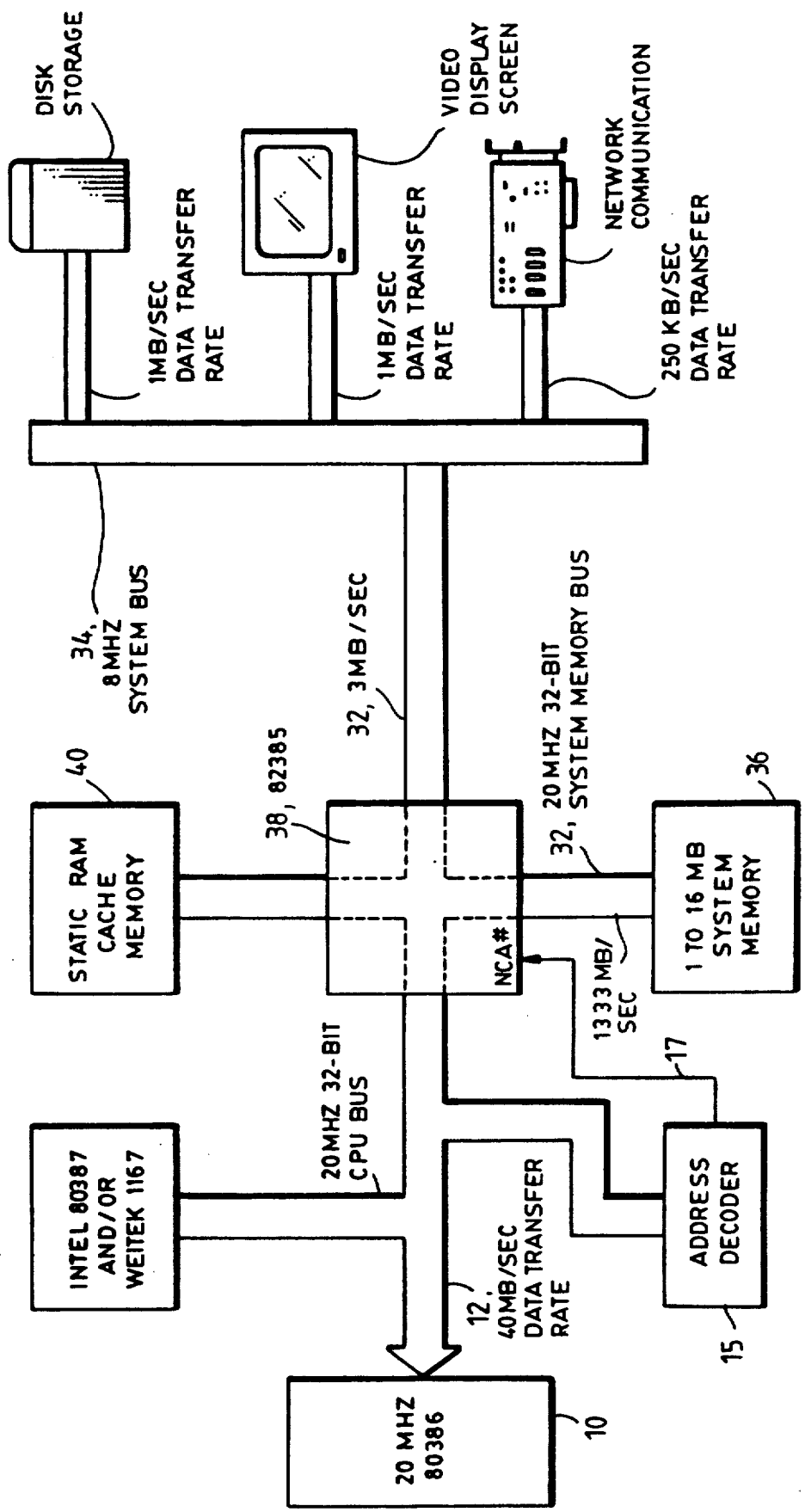
FIG. 13 is a diagram of the 82385-based Compaq X-15 architecture, employing features of the present invention, i.e., with an additional decoding means 15.

The COMPAQ X-15 system architecture centers around a sophisticated, VLSI cache/bus controller, the Intel 82385. The Intel 82385 cache controller 38 is the foundation of the COMPAQ X-15 architecture as depicted in FIG. 13. In this architecture, the 82385 cache controller 38 functions as a cache memory controller whose primary role is to ensure the fast, static RAM memory 40 contains the data most frequently used by the 80386 microprocessor 10. The majority of the 80386 microprocessor 10 requests for instructions and data are thus serviced from the cache memory 40 without the need to access the relatively slower system memory 36.

The CPU 10 and the fastest memory devices—the Intel 82385cache controller 38, its cache memory 40, and the numeric coprocessors—are connected by a 32-bit 20-MHz CPU bus 12 depicted in FIGS. 2-4 and FIG. 13. This bus can support the 40Mbyte/second throughput of these fast memory devices. The 82385 cache memory controller 38 and its cache memory 40 use this bus to serve approximately 95% of all memory requests. These memory operations occur with no wait states.

The Intel 82385 cache controller 38 also functions as a system and memory bus controller. By combining these roles, the 82385 cache controller 38 can service the data requests of the 80386 microprocessor 10 quickly and allow other operations such as DMA or bus master operations to occur simultaneously on the system bus 32 and the system memory 36.

The 20-MHz, 32-bit system memory bus 32 shown in FIGS. 2-4 and FIG. 13 connects the Intel 82385 cache controller 38 to up to 16Mbytes of 100 ns., dynamic random access memory 36. This memory operates with 4 wait states providing an effective data transfer rate of 13.33 Mbytes/second. Since most CPU requests for data are served from the cache memory 40, the system memory 36 is only utilized for approximately 5% of all memory operations. The system memory 36 connected to this bus 32 can be accessed either from the CPU 10 via the 82385 cache controller 38 or from other DMA or bus master devices on the system bus.

COMPAQ X-15 memory expansion attaches to the system through a 32-bit memory bus, which allows up to 16MB of expansion memory without using peripheral bus expansion slots. Only one 32-bit bus slot is supplied since system memory is the only I/O subsystem that requires a 32-bit slot. Memory expansion beyond 16 MB is not needed because the virtual paging facility of the 80386 CPU 10 enables applications to efficiently use the 16 MB of physical memory 36 in conjunction with disk storage. The COMPAQ X-15 memory architecture also maintains compatibility with industry-standard personal computer DMA and bus masters, which support 16 MB.

The system bus 32 includes an 8-MHz, 8-/16-bit, industry-standard bus capable of supporting the vast number of existing industry-standard peripherals. The system bus is controlled by the Intel 82385 cache controller 38 to allow simultaneous CPU and system bus operations. As used in the COMPAQ X-15, the system bus is capable of supporting a data transfer rate of 3 Mbytes/second. That is, I/O peripherals can transfer data to and from system memory at this rate. The 3 Mbyte/second data transfer rate provides ample support for even the fastest I/O devices. FIG. 13 shows the system bus and the maximum data transfer rate of typical I/O devices.

The ability of the Intel 82385 cache controller 38 to support simultaneous CPU and system bus operations is one of the key system improvements included in the COMPAQ X-15. This capability is particularly effective in multi-processor applications using intelligent I/O controllers. Intelligent I/O controllers are commonly used in network and communication controllers as well as disk controllers.

In such an application, as data requests by the main CPU 10 (80386) are being serviced from the fast cache memory 40, the I/O controller can be accessing system memory 36 simultaneously thru DMA or bus master operations. By servicing most 80386 microprocessor 10 data requests from the cache memory, the 82385cache controller 38 significantly reduces CPU activity on the system bus 32 and thus allows more effective utilization of the system bus by peripheral devices. The ability of the 82385cache controller 38 to optimize CPU data transfers while simultaneously allowing other bus operations to occur enhances both CPU efficiency and system bus throughout to peripheral devices.

Such sophistication is made possible by the very large scale integration of the Intel 82385 cache/bus controller 38. Discrete and low-level integration cache implementations are not as powerful. The X-15 is the first personal computer to include such capabilities as an integral part of its industry-standard architecture.

Memory Architecture

Personal computers use a variety of memory architectures including simple dynamic RAM, interleaved, static RAM, paged, and cache. The level of optimization achieved by each of these memory architectures has a significant effect on the overall system performance. The following describes the various types of memory architectures used in personal computers and compares them in terms of speed and the ability to support high speed CPU's.

A memory subsystem can be characterized in terms of how well it matches the CPU and by how many cycles the CPU must wait from the time it requests data from the memory subsystem and until the data is available.

In personal computer architectures based on 80286 and 80386 CPU's, a minimum of two CPU cycles are required to complete a memory transaction. Each additional cycle, referred to as a wait state, represents a cycle the CPU must wait before the memory transaction is completed. A no-wait-state memory system can provide data to the CPU in two cycles and is thus the fastest memory subsystem possible. The more wait states a memory subsystem requires, the slower it is and the lower the CPU performance is for a given CPU clock rate. For example, the IBM 16-MHz Model 80 is a 1-wait-state system. It requires the normal two CPU cycles plus an extra cycle for the memory.

The processor speed determines the length of a wait state. At 12 MHz each CPU cycle and therefore each wait state is 83.3 ns., while at 20 MHz a wait state is only 50 ns. The faster the CPU, the faster the memory subsystem must be to maintain system performance. The choice of memory architecture is a critical one and must be made by carefully evaluating available memory technologies, cost and overall system performance.

Dynamic RAM Architecture

Most personal computers use an architecture based on dynamic random access memory devices. A dynamic RAM architecture has offered the simplest, most cost-effective design for early personal computers when CPU speeds did not demand a high performance memory subsystem. For those systems, dynamic RAM devices could easily by found to meet the demands of the CPU.

As CPU innovations have improved the speed and ability of CPU's to access data, simple dynamic RAM designs have not been able to provide memory subsystems with sufficient performance. Even using the fastest dynamic RAM devices available today (80 ns. access time), a minimum of 1 wait state would be required for a 16-MHz, 80386-based system. Such a system executes at approximately 80% of the 16-MHz CPU speed.

The 16-MHz IBM PS/2 Model 80 uses a dynamic RAM architecture with one wait state. At 20 MHz, a 80386-based system using dynamic RAM's typically would require at least two wait states. The degradation in CPU performance resulting from 2 wait states makes a dynamic RAM memory architecture impractical for a 20-MHz high performance 80386-based system.

Interleaved Memory Architecture

The performance of dynamic RAM architectures can be improved by interleaving the memory into two separate memory banks. Each bank is organized by 32 bits of data (a double word is 32 bits of information). One bank contains data for even double words and the second bank contains data for odd double words. A CPU reading sequential memory locations can simultaneously read data from one bank and start a memory access to the second bank.

A 20-MHz, 80386-based system completes non-sequential memory accesses within 2 wait states. Sequential memory accesses complete with no wait states. Since approximately 40 to 50% of the memory cycles occur sequentially, an interleaved memory system typically needs a slightly more than 1 wait state for most business applications. Such a system executes at approximately 75 to 80% of the maximum 20-MHz CPU speed with most business applications.

A disadvantage of an interleaved memory architecture is its expansion capability, which could force you to purchase more memory than you need. Memory expansion requires adding a pair of memory banks each time the memory capacity is expanded. For example, using an interleaved memory system with 256Kbit dynamic RAM's, a minimum memory increment of 2 megabytes is required. Using 1Mbit dynamic RAM's requires a minimum memory increment of 8 megabytes.

Static RAM Architecture

A static RAM architecture avoids the wait states found in the dynamic RAM designs. Statis RAM devices operate at much higher speeds, making a no wait state memory subsystem possible. Static RAM works well for small memory systems, but it is not practical in large memory subsystems because it takes up too much space and is relatively expensive.

Paged Memory Architecture

A paged memory architecture is based on the characteristics of special RAM devices. The RAM devices allow consecutive accesses within the same "page" of memory to be much faster than accesses to different pages. The success of a paged memory architecture comes from the fact that with most personal computer applications approximately 60% of all the memory accesses occur consecutively within a 2-Kbyte page. This allows paged memory subsystems to achieve an average number of wait states slightly less than one. Such a system performs at approximately 80 to 85% of 20-MHz CPU speed with most business applications. The 16-MHz COMPAQ DESKPRO 386 uses a paged memory architecture that achieves approximately 0.8 wait states per memory access.

Cache Memory Architecture

The COMPAQ X-15 uses a cache memory architecture based on the Intel 82385 cache/bus controller 38. The Intel 82385 provides a number of important features which are not possible in most other cache memory implementations. These features combine to allow the COMPAQ X-15 memory subsystem to approach 100% of the 20-MHz CPU speed with most business applications. This performance level is 15 to 25% above 20-MHz 80386-based products using other memory architectures.

Cache memory architectures have been used to improve the memory subsystem performance in minicomputers for quite some time. Until recently, however, the complexity required to implement these key performance features has limited the development of cache memory systems for a personal computer. Unless these features are implemented, cache memory subsystems do not achieve significant speed benefits over the memory architectures. The basic concepts of a cache memory architecture and the key features of the Intel 82385 controller 38 are discussed in the following sections.

Memory Caching Concepts

The cache memory architecture combines the best features from the static RAM and dynamic RAM architectures. It uses a cache memory 40 of fast (35 ns.), static RAM devices for no wait state operation, and a large system memory 36 of relatively slower (100 ns.), dynamic RAM devices for high capacity. The cache memory architecture keeps a copy of the most frequently used data or instructions in high speed static RAM 40, which can provide no wait state operation for the majority of the memory 36 operations. System memory refers to the conventional dynamic RAM memory used to contain program and data for execution. The standard 1Mbyte of system memory 36 on the 32-bit system memory board consists of thirty six 256-Kbits, 100 ns., dynamic RAM devices. The use of 100 ns. dynamic RAM devices requiring 4 wait states does not restrict the CPU 10 since most CPU memory requests are serviced from the high-speed cache memory 40.

The COMPAQ X-15 contains an integral 82385 cache controller 38 with 32Kbytes of very fast static RAM 40. Information exchanges with the CPU 10 and fast memory 40 can occur with no wait states at the full 20-MHz rate. That is, 32 bits of information can be transferred in 2 CPU cycles of 50 ns. each (100 ns. total). The 82385 cache controller processes all memory requests from the CPU 10. As the CPU requests data or instructions from system memory 36, they are passed onto the CPU 10 and stored in the cache memory 40. The 82385 cache controller 38 thus keeps a record of which memory locations are contained in the cache memory 40. Subsequent requests for a particular memory location already contained in the cache 40 can then be served from the fast static RAM cache area without accessing system memory 36. Once the cache 40 has been filled with instructions and data, the 82385 cache controller 38 replaces the least frequently used data with the data most recently used by the CPU 10. By keeping the most frequently used data in the cache memory 40, most memory operations can be serviced by the 82385 with no wait states.

The COMPAQ X-15 shows that the cache memory architecture based on the Intel 82385 cache controller 38 approaches the maximum performance at 20 MHz.

This provides the COMPAQ X-15 with a level of CPU performance 15 to 25% greater than other 20-MHz 80386-based system and approximately 50% greater than leading 16-MHz, 80386-based products such as the COMPAQ DESKPRO 386.

Intel 82385 Performance Features

The Intel 82385 cache controller 38 includes a number of extended capabilities that distinguish it from other cache controllers. The following is a discussion of these features and their related performance benefits.

The ability of the 82385 cache controller 38 to perform posted write operations offers a significant advancement over other simpler cache implementations. In a traditional memory cache, write operations always use the relatively slower system memory 36. Typically this means that memory write operations incur a two to four wait state penalty. Since in most business applications 10 to 15% of all memory operations are write operations, such a penalty results in a substantial CPU performance degradation. With the 82385 cache controller 38, most write operations are posted. That is, write operations from the CPU 10 are performed with no wait states. The 82385 cache controller 38 assumes the responsibility of writing the data to the system memory 40 and updating the cache memory while the CPU 10 continues. In this manner, the CPU 10 is not penalized by the amount of time required by the cache controller 38 to perform housekeeping functions with the cache 40 and system memory 36.

As previously mentioned, the 82385 also acts as a bus controller. The 82385 is capable of allowing simultaneous memory 40 accesses by the CPU from the cache memory and other bus operations between the system bus and the system memory bus. For example, a device can execute DMA transfers to system memory 36 while the CPU continues to obtain instructions and data from the cache memory 40. To accomplish these simultaneous accesses, the 82385 includes significant functionality to maintain coherency between the contents of the cache 40 and system memory 36. As system memory operations occur through the system bus, the 82385 must, in real time, update the cache memory 40 contents with the most recent system memory contents. This 82385 function improves the system bus utilization significantly and allows for greater throughput by peripheral devices.

On the COMPAQ X-15, the 82385 is configured as a two-way-associative cache as illustrated in FIG. 8. This means that the 32Kbytes of cache memory 40 are divided into 2 sets of 16Kbytes each. By dividing the cache memory 40 into sets, the cache can better support the CPU executing multitasking operating systems such as OS/2 and UNIX. These sets better serve the diverse localities of program and data characteristic of multiple application tasks executing concurrently. The two-way set association does not have a noticeable performance impact on single task operations such as those of MS-DOS applications.

NON-CACHE ADDRESS RANGE

Non-Cacheable Address Range for Cache 80386 Systems For Industry-Standard 80286-Based Compatibles In current 8086-, 8088-, and 80286-based products, the memory address range from the top of system memory to the base of the system ROM's is available for several types of memory mapped I/O devices. Among them are display driver cards, local area networks, and other devices requiring a ROM or other memory interface.

In developing an 80386 cache based system, it was determined that maximum performance could be obtained by cacheing all of the system memory. This caused problems with the memory mapped I/O class of products such as these displays etc. The problem occurs when the I/O adapter memory is changed by something other than the CPU through this cache controller. In this case, the cache RAM could contain a copy of the original contents of the I/O memory instead of the current data, causing improper operation of the application program.

An example of this behavior is the EGA display adapter. It consists of up to 128 kbytes of memory mapped into a 32kbyte space (in some models). The mapping is done by changing memory "planes" via I/O instructions in order to bring one of the several "planes" to the foreground for access by the CPU 10. The changing of the "planes" is a rather large and sudden change of that portion of memory (as far as the cache controller 38 is concerned).

The solution for this problem is to set the portions of memory that are used by these I/O adapters to be non-cachable. This prevents the cache controller 38 from maintaining any copy of these areas and prevents the coherency problem.

In general it would be desirable for the logic that controls the non-cachable memory areas to understand exactly what memory exists and is to be cached. In practice, with the Intel 80386-20 and the 82385-20 at 20 MHz, the time allowed for decoding the cachable memory address is only 8 nanoseconds. With this limitation, only very specific memory areas can be handled within the current limits of the technology. In a preferred implementation, the logic is placed in a programmable array logic (PAL) device 15 at the leading edge of the technology (10 nsec. tested for 8 nanoseconds, e.g., Texas Instruments 16R4-10). The equation is shown below. The 512K and 640K terms are used to give back some of the base RAM space to the expansion bus when the 32-bit memory is turned off (either 256k or 512k of base memory is provided by the 32-bit memory).

NCA = /A31* /A23* /A22* /A21* /A20* /A19* A18* /512K +

/A31* /A23* /A22* /A21* /A20* A19* /A18* /A17* /640K +

/A31* /A23* /A22* /A21* /A20* A19* /A18* A17 +

/A31* /A23* /A22* /A21* /A20* A19* A18* /A17 +

/A31* A23* A22* A21* A20* A19* A18* A17* CPROM + A31 +

DNCA where A17-A31 are address lines 14, NCA is the non-cacheable access input 17 to the 82385 cache controller 38, CPROM and DNCA are software-selectable diagnostic settings, "+" indicates a Boolean "or" operation, "*" indicates a Boolean "and" operation, and "/" indicates a "not" or inversion.

It is generally recognized that certain portions of main memory such as those portions utilized by memory-mapped I/O devices should be designated non-cacheable. The Intel 82385 cache controller 38 has a non-cacheable access (NCA) input 17 for this purpose. However, for fast systems, severe time restrictions are placed on the logic needed to decode the address lines 14 to determine whether the NCA input 17 should be activated to identify an 80386 cycle as non-cacheable.

When an 80386 microprocessor 10 is operating at 20 megahertz, each cycle of the processor takes 50 nanoseconds (ns), i.e., $50 \times 10^{-9}$ seconds. Typically, up to about 32 ns are required for the address lines 14 to settle and up to about 10 ns are needed by the 82385 cache controller 38 to process an input and provide an output. Thus, the logic 15 to decode the address lines to determine whether the particular memory location being accessed is to be cached has to function within a "window" which may be as small as about 8 ns $(50-(32+10))$.

With the current technology, only relatively simple programmable array logic (PAL) devices are available which can function within this time frame. Accordingly, it is necessary to provide very concise logic functions to decode the address lines 14 (and other lines) to determine whether a given memory location is to be cached.

Lines other than address lines 14 which are input to the preferred PAL equation include hardware switch settings for designating the amount of RAM installed in the system, a diagnostic bit (DNCA) for disabling the memory cache system, and a CPROM bit to designate whether a high-memory copy of the ROM is being utilized (e.g., high RAM is mapped into the location of the BIOS ROM).

The PAL 15 inputs comprise selected address lines 14, the DNCA bit, the CPROM bit, and lines from the memory-size-select switches. The PAL output comprises the Next Address Request, Local Bus Access, and Non-Cacheable Access lines.

```
; LBA =
; A31* A30* /A29        ; C0000000H WEITEK
;
; Note: Only the three top lines of the WEITEK should be
; connected to keep the alias addresses the same as here
; (to prevent bus lock).
; Note: LBA is currently disabled to prevent from
; interfering with the D5-SFIX pal.

; NA = NAO * /A19 * /A18 ;GOOD FOR 00000000-0003FFFFH
;     + NAO * /A19 * 512K ;GOOD FOR 00000000-0007FFFFH
;     + NAO * /A18 * 640K ;GOOD FOR 00080000-0009FFFFH
;     + NAO * A20         ;GOOD FOR 00100000-00FFFFFFH
;     + NAO * A21
;     + NAO * A22
;     + NAO * A23
;
; Note: 386 Next address is limited during operations to
; the base memory due to the slowdown effect it has on the
; very slow memory.

NCA = /A31* /A23* /A22* /A21* /A20* /A19* A18* /512K
      ;00040000H 256K
    + /A31* /A23* /A22* /A21* /A20* A19* /A18* /A17* /640K
      ;00080000H 128K
    + /A31* /A23* /A22* /A21* /A20* A19 /A18* A17
      ;000A0000H 128K
    + /A31* /A23* /A22* /A21* /A20* A19* A18* /A17
      ;000C0000H 128K
    + /A31* A23* A22* A21* A20* A19* A18* A17 CPROM
      ;00FE0000H 128K
    + A31      ;ALL HIGH STUFF
    + DNCA     ;DIAG TURNOFF
```

FUNCTION TABLE
A31 A30 A29 A23 A22 A21 A20 A19 A18 A17 /CPROM /DNCA
/512K /640K /NAO /NCA /LBA /NA

```
;           /
;           C / / /
;           P D 5 6 / / /
; A A A A A A A A A A R N 1 4 N N L /
; 3 3 2 2 2 2 2 1 1 1 0 C 2 O A C B N
; 1 0 9 3 2 1 0 9 8 7 M A K K O A A A
  L L L L L L L L L L L L H H H L H H L    INACTIVE
  L L L L L L L L L L L L L H H H L H H    DIAG NCA
  H H L L L L L L L L L L H H H L L L L    C0000000H 128K
  L L L L L L L L L H L L H H H L L H H    00040000H 256K
  L L L L L L L L H L L L H H H L L H H    00080000H 128K
  L L L L L L L L H L H L H H H L L H H    000A0000H 128K
  L L L L L L L L H H L L H H H L L H H    000C0000H 128K
```

Implementation

Our implementation is done is a gate array and consists of a counter to count out tPAL16L8D.

PA20 PA21 PA22 PA23 PA29 PA30 PA31 /PADS PW_R GND
PA19 /386NA PA17 PA18 /385NA CALEN BS /CRDY
/LBA VCC

EQUATIONS

LBA = PA31 * PA30 * /PA29 + WBS * CRDY +
/PADS * WBS * CALEN + PADS * CRDY * PW_R

386NA = /WBS * 385NA * /PA18 +
/WBS * 385NA * /PA19 +/WBS * 385NA * /PA20 +
/WBS * 385NA * /PA21 + /WBS * 385NA * /PA22 +
/WBS * 385NA * /PA23

; Note: Only the three top lines of the WEITEK should be
; connected to keep the alias addressee the same as here
; (to prevent bus lock).

FUNCTION TABLE
PA31 PA30 PA29 PA23 PA22 PA21 PA20 PA19 PA18 PA17
/385NA WBS /PADS PW_R /CRDY CALEN /LBA /386NA

```
;              /          /
;              3    /  / C 3
;              8       P P C A / 8
; A A A A A A A A A S W A W R L L 6
; 3 3 2 2 2 2 2 1 1 1 N B D - D E B N
; 1 0 9 3 2 1 0 9 8 7 A S S R Y N A A
  H H L L L L L H L L L L H L H L L L    LBA:1  NA:1
  L L L L L L L L L L L L H H L L L L H  LBA:2
  L L L L L L L L L L L H H L H H L H    LBA:3
  L L L L L L L L H L L L L H L L L L    LBA:4  NA2
  L L L L L L H H H L L L H L H L H L    LBA:0  NA3
  L L L L L H L H H L L L H L H L H L    NA:4
  L L L L H L L H H L L L H L H L H L    NA:5
  L L L H L L L H H L L L H L H L H L    NA:6
  L L L H L L L H H L H L H L H L H H    NA:0
```

Description

This PAL is used in the D5 (386 CACHE) processor board to decode the Local Bus Access and Next Address signals to fix up the 385 bugs.

```
L L L H H H H H H H L H H H L L H L    00FE0000H 128K
L L L H H H H H H H H H H H L H H L    00FE0000H 128 K
ROM COPY                                NO
H H H L L L L L L L L H H H L L H L    E0000000H
L L L L L L L H L L L H H L L H H L    00080000H 128K
ACTIVE                                  640K
L L L L L L L L H L L H L H L H H L    00040000H 256K
```

-continued

| ACTIVE | 512K |
|---|---|

Description

This PAL is used in the D5 (386 CACHE) processor board to decode the Non Cachable Address and Local Bus Access signals.

What is claimed is:

1. A computer system capable of designating selected portions of memory as containing non-cacheable data, comprising:

(a) a microprocessor which generates memory addresses and memory controls;

(b) a main memory;

(c) a cache controller receiving memory addresses and memory controls from said processor;

(d) a cache memory coupled to said cache controller; and (e) an address decoder comprising programmed array logic programmed to satisfy the following logic equations:

(i) NA = NAO * /A19 * /A18
+ NAO * /A19 * 512K
+ NAO * /A18 * 640K
+ NAO * A20
+ NAO * A21
+ NAO * A22
+ NAO * A23;

(ii) NCA = /A31 * /A23 * /A22 * /A21 * /A20 * /A19 * A18 * /512K
+ /A31 * /A23 * /A22 * /A21 * /A20 * A19 * /A18 * /A17 * /640K
+ /A31 * /A23 * /A22 * /A21 * /A20 * A19 * /A18 * A17
+ /A31 * /A23 * /A22 * /A21 * /A20 * A19 * A18 * /A17
+ /A31 * A23 * A22 * A21 * A20 * A19 * A18 * A17 * CPROM
+ A31 where:

A17-A31 = input address lines from said microprocessor;

CPROM = a second input software-selectable diagnostic bit from said microprocessor for designating whether a high-memory copy of said system ROM is being utilized;

512K and 640K = input lines from said microprocessor for indicating the desired size of the base memory;

NA = an output signal the inverse of which is sent to a designated port of said microprocessor requesting the next address; and NCA = an output signal the inverse of which is sent to a designated port of said cache controller indicating whether said address from said microprocessor contains non-cacheable data;

* = a Boolean AND operation;

+ = a Boolean OR operation; and

/ = a NOT or inversion operation.

* * * * *